United States Patent [19]
Ito et al.

[11] Patent Number: 6,076,420
[45] Date of Patent: Jun. 20, 2000

[54] POWER TRANSMISSION CHANGEOVER DEVICES FOR FOUR-WHEEL DRIVE VEHICLES

[75] Inventors: Kenichiro Ito; Isao Hori, both of Shizuoka; Koji Akiyoshi, Hamamatsu, all of Japan

[73] Assignee: NTN Corporation, Osaka, Japan

[21] Appl. No.: 09/161,537

[22] Filed: Sep. 28, 1998

[30] Foreign Application Priority Data

Sep. 30, 1997 [JP] Japan ..................................... 9-266510
Dec. 19, 1997 [JP] Japan ..................................... 9-351135

[51] Int. Cl.[7] ......................... B60K 17/354; F16D 25/04; F16H 37/06
[52] U.S. Cl. .................................. 74/473.11; 74/665 GA; 180/233; 180/247; 192/85 V; 192/87.13
[58] Field of Search ........................ 74/473.11, 665 GA; 192/85 V, 87.13; 180/233, 247

[56] References Cited

U.S. PATENT DOCUMENTS

| | | | |
|---|---|---|---|
| 2,537,400 | 1/1951 | Drong | 180/22 |
| 4,407,387 | 10/1983 | Lindbert | 180/247 |
| 4,733,574 | 3/1988 | Uchiyama | 180/247 X |
| 4,747,463 | 5/1988 | Yoshinaka et al. | 180/247 |
| 4,858,716 | 8/1989 | Kano et al. | 180/233 |
| 5,740,697 | 4/1998 | Yamase | 180/247 X |

*Primary Examiner*—Allan D. Herrmann
*Attorney, Agent, or Firm*—Wenderoth, Lind & Ponack, L.L.P.

[57] ABSTRACT

A power transmission changeover device for an automatic-transmission, four-wheel drive vehicle which can prevent rattling of gears while the gear position of the sub-transmission is being changed over. Air pipes extending from a negative pressure source for actuating an actuator for changing over gears of a sub-transmission, and electromagnetic valves have inner diameters of 4 mm or over. An accumulator is provided between the electromagnetic valves in the air pipes and the negative pressure source. This makes it possible to increase the operating speed and operating force of the actuator and, to shorten the duration of the neutral position when gears are changed over, and to increase the meshing force with new gears. It is thus possible to prevent rattling of gears due to improper meshing of gears.

2 Claims, 22 Drawing Sheets

POWER TRANSMISSION CHANGEOVER DEVICES FOR FOUR-WHEEL DRIVE VEHICLES

BACKGROUND OF THE INVENTION

This invention relates to power transmission changeover devices for four-wheel drive vehicles, and particularly a power transmission changeover device having a sub-transmission.

Four-wheel drive vehicles are classified into part-time 4WD's, in which four-wheel (4WD) and two-wheel (2WD) drive modes are changed over by manual operation of a lever or switch, and full-time 4WD's, in which driving torque distribution to the front and rear wheels is automatically adjusted according to the difference in rotation speed between the front and rear wheels.

Many part-time 4WD's have, besides the main transmission, a sub-transmission adapted to change over between a high position for a normal 4-WD travel and a low position for traveling over rough or sandy roads. The sub-transmission includes a gear train for changing over the driving force transmission path, and constitutes a part of the power transmission changeover device for changeover between 4WD and 2WD.

The sub-transmission is changed over by the driver by operating a lever or switch with the main transmission in the neutral position to shut off the torque from the engine.

To change over the position of the sub-transmission, it is moved from the high-gear or low-gear position to the neutral position, and then to the low-gear or high-gear position. In the case of an automatic transmission (hereinafter abbreviated to "AT") vehicle, gears may rattle during such gear position changeover.

In AT cars, slight torque tends to be transmitted to the output shaft of the transmission even when it is in the neutral position. Thus, if no brakes are applied, the vehicle will begin to move slowly (creep). Such creeping is especially remarkable when it is cold because oil in the transmission is high in viscosity in a cold environment.

As described above, the sub-transmission is changed over with the main transmission in the neutral position. In the case of an AT car, during a very short period while the gear position of the sub-transmission passes through the neutral position, gears of the sub-transmission provided at the output side of the main transmission rotate due to creeping of the vehicle. This makes smooth meshing of new gears difficult. Gears thus tend to rattle.

An object of this invention is to provide a power transmission changeover device for an automatic-transmission, four-wheel drive vehicle which produces no rattling of gears while the gear position of the sub-transmission is being changed over.

In this type of actuator of a power transmission changeover device having a diaphragm, it is necessary to keep sucking air to maintain the new position even after the drive mode has been changed over between 4WD and 2WD or between high and low.

Thus, while the drive mode is held in any of these positions, a load keeps acting on the thin diaphragm, thus lowering its durability. Also, while air is being sucked, the negative pressure from the engine manifold tends to fluctuate, thus decreasing the reliability of the actuator.

Thus another object of this invention is to provide a power transmission changeover device for a four-wheel drive vehicle which can improve durability and reliability of its actuator.

SUMMARY OF THE INVENTION

According to this invention, there is provided a power transmission device for a four-wheel drive vehicle comprising a first rotary shaft for transmitting an output of a transmission, a high gear mounted on the outer periphery of the first rotary shaft at one end thereof, a second rotary shaft provided coaxially with the first rotary shaft for transmitting power to one of a front propeller shaft and a rear propeller shaft, a neutral gear relatively nonrotatably mounted on the outer periphery of the second rotary shaft at one end thereof in proximity to the high gear, a low gear relatively rotatably mounted on the second rotary shaft in proximity to the neutral gear, a slide gear provided so as to be slidable in the axial direction of the first and second rotary shafts, and an actuator operated under air pressure through electromagnetic valves and connected to the slide gear. The slide gear is adapted to mesh with the high gear and neutral gear advanced, and with the low gear and the neutral gear when moved backward, whereby the transmission path of rotation torque from the first rotary shaft to the second rotary shaft is changed over by a gear train comprising the high gear, low gear and neutral gear. Pipes leading from a source of the air pressure for operating the actuator and the electromagnetic valves have inner diameters of 4 mm or over, and an accumulator is provided between the electromagnetic valves in the pipes and the air pressure source.

The pipes extending from the air pressure source for operating the actuator and the electromagnetic valves have inner diameters of 4 mm or over. It is thus possible to increase the operating speed of the actuator. The accumulator provided between the electromagnetic valves in the pipes and the air pressure source increases the operating force of the actuator. It is thus possible to shorten the time required for the slide gear to mesh with a new gear after being disengaged from the high gear or low gear, and to increase the meshing force with the new gear. This prevents improper meshing of gears due to creeping of the vehicle.

The pipes and the electromagnetic valves have inner diameters of 4 mm or over. If less than 4 mm, the operating speed of the actuator will not increase enough to prevent gear rattling.

Since the slide gear and the actuator are connected together through a push/pull wire, forward and backward motions of the actuator can be transmitted to the slide gear while maintaining high rigidity. This prevents gear rattling more reliably.

In order to solve the second problem, there is provided a power transmission changeover device for a four-wheel drive vehicle comprising a rotary shaft arranged coaxially with an output shaft of a transmission for transmitting the rotation torque of the transmission output shaft to one of a front propeller shaft and a rear propeller shaft, a first rotary member relatively nonrotatably mounted on the rotary shaft, a second rotary member relatively rotatably mounted on the rotary shaft, adjacent the first rotary member, for transmitting power to the other of the front and rear propeller shafts, a slide member engageable with the first and second rotary members, an actuator for moving the slide member in an axial direction of the rotary shaft between two positions in which the two rotary members are coupled together and uncoupled from each other, respectively, and means for holding the slide member in at least one of the two positions by pressing, attraction or engagement.

There is also provided a power transmission changeover device for a four-wheel drive vehicle comprising a rotary shaft arranged coaxially with an output shaft of a transmission for transmitting the rotation torque of the transmission output shaft to one of a front propeller shaft and a rear propeller shaft, a first rotary member relatively nonrotatably mounted on the rotary shaft, a second rotary member relatively rotatably mounted on the rotary shaft, adjacent the first rotary member, for transmitting power to the other of the front and rear propeller shaft, a high gear provided on the outer periphery of the output shaft of the transmission at one end thereof, a neutral gear relatively nonrotatably mounted on the rotary shaft at one end thereof adjacent the high gear, a low gear relatively rotatably mounted on the rotary shaft at a position adjacent the neutral gear, a slide member engageable with the high, neutral and low gears, an actuator for moving the slide member in an axial direction of the rotary shaft between a high position in which the slide member engages the high gear and the neutral gear, and a low position in which the slide member engages the low gear and the neutral gear, thereby changing over torque transmission from the output shaft of the transmission to the rotary shaft, and means for holding the slide member in at least one of the two positions by pressing, attraction or engagement.

The provision of the means for holding the slide member in position makes it possible to hold the slide member in a desired drive position with the actuator deactivated. Thus, the durability and reliability of the actuator improves.

In one specific arrangement, the actuator comprises a diaphragm actuated by air pressure, and the means for holding the slide member in position comprises a biasing means for pressing the diaphragm to keep it in position when the diaphragm has been moved to a position for keeping the slide member in position.

In another arrangement, the means for holding the slide member in position comprises a biasing means for pressing the slide member to keep it in position when the slide member has been moved by the actuator to one side.

For a large part of the time, the slide member is held in the 2WD or high position. Thus, by providing a means for holding the slide member in 2WD or high position, it is possible to greatly reduce a load required to hold the actuators in position.

Other features and objects of the present invention will become apparent from the following description made with reference to the accompanying drawings, in which:

DETAILED DESCRIPTION OF THE PREFERRED EMBODIMENT

[First Embodiment]

Figure 1:
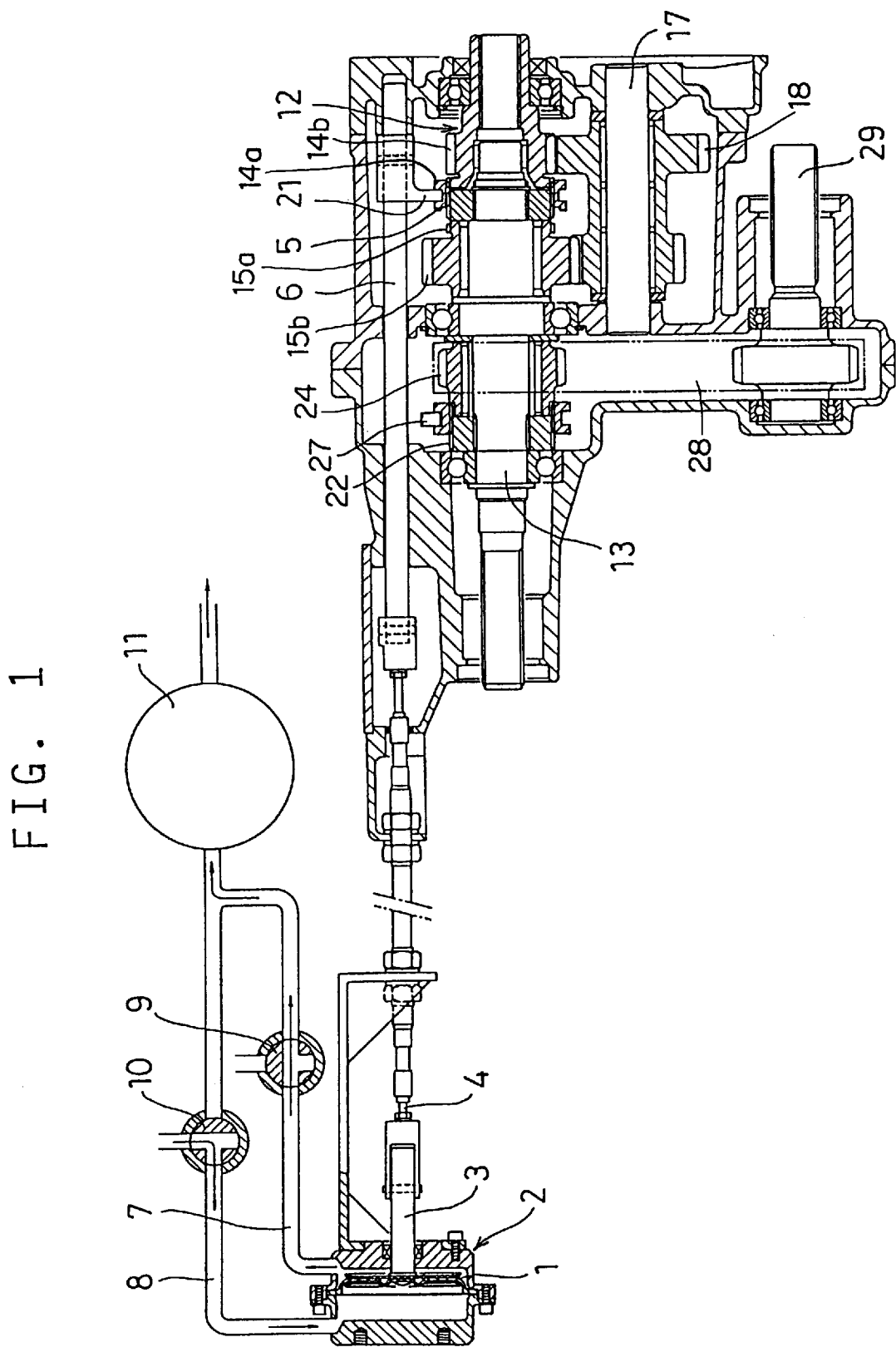
FIG. 1 is a partial sectional view of a power transmission changeover device embodying the present invention.
Figure 2:
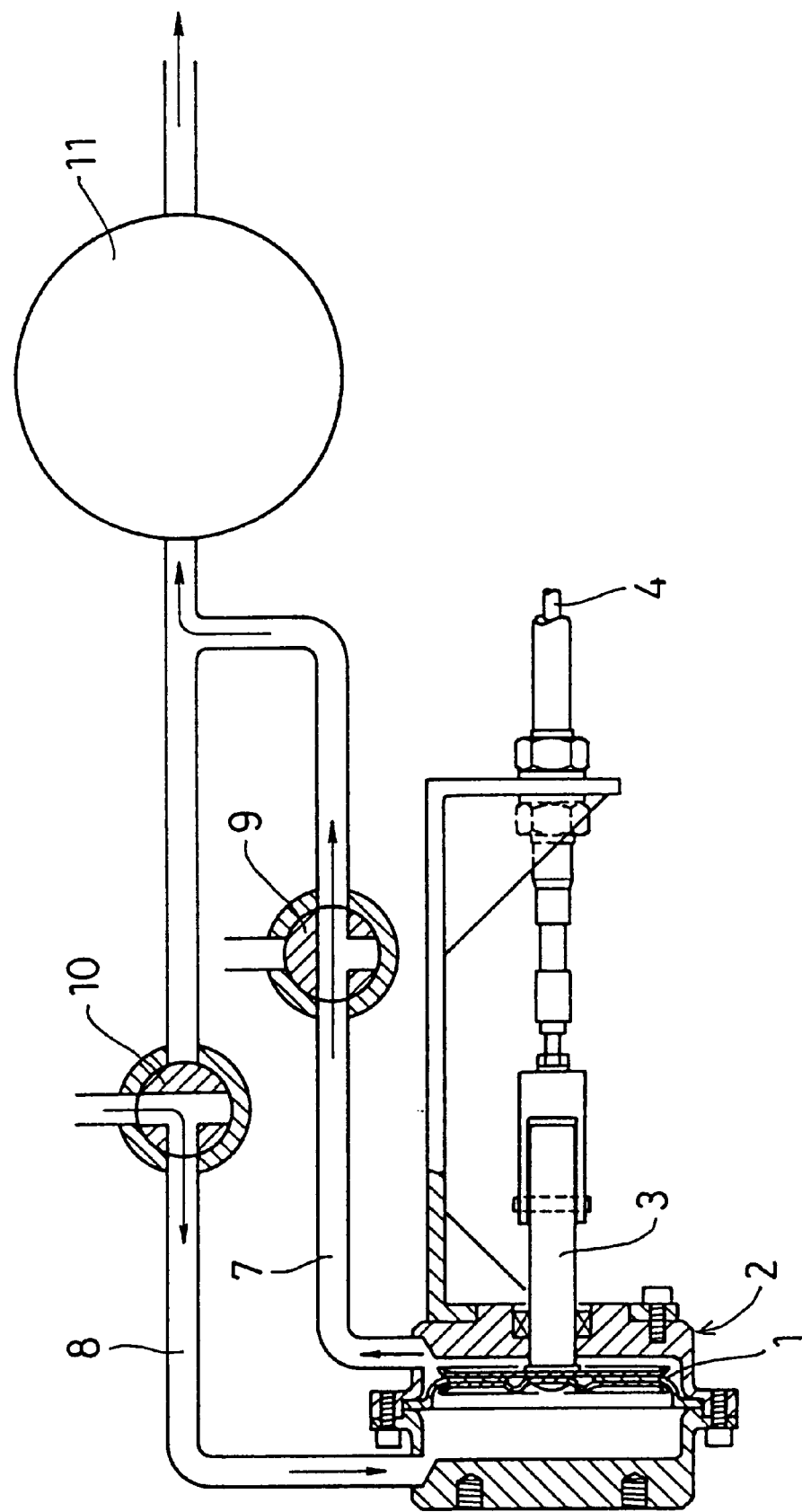
FIG. 2 is an enlarged sectional view of an actuator in the device of FIG. 1.
Figure 3:
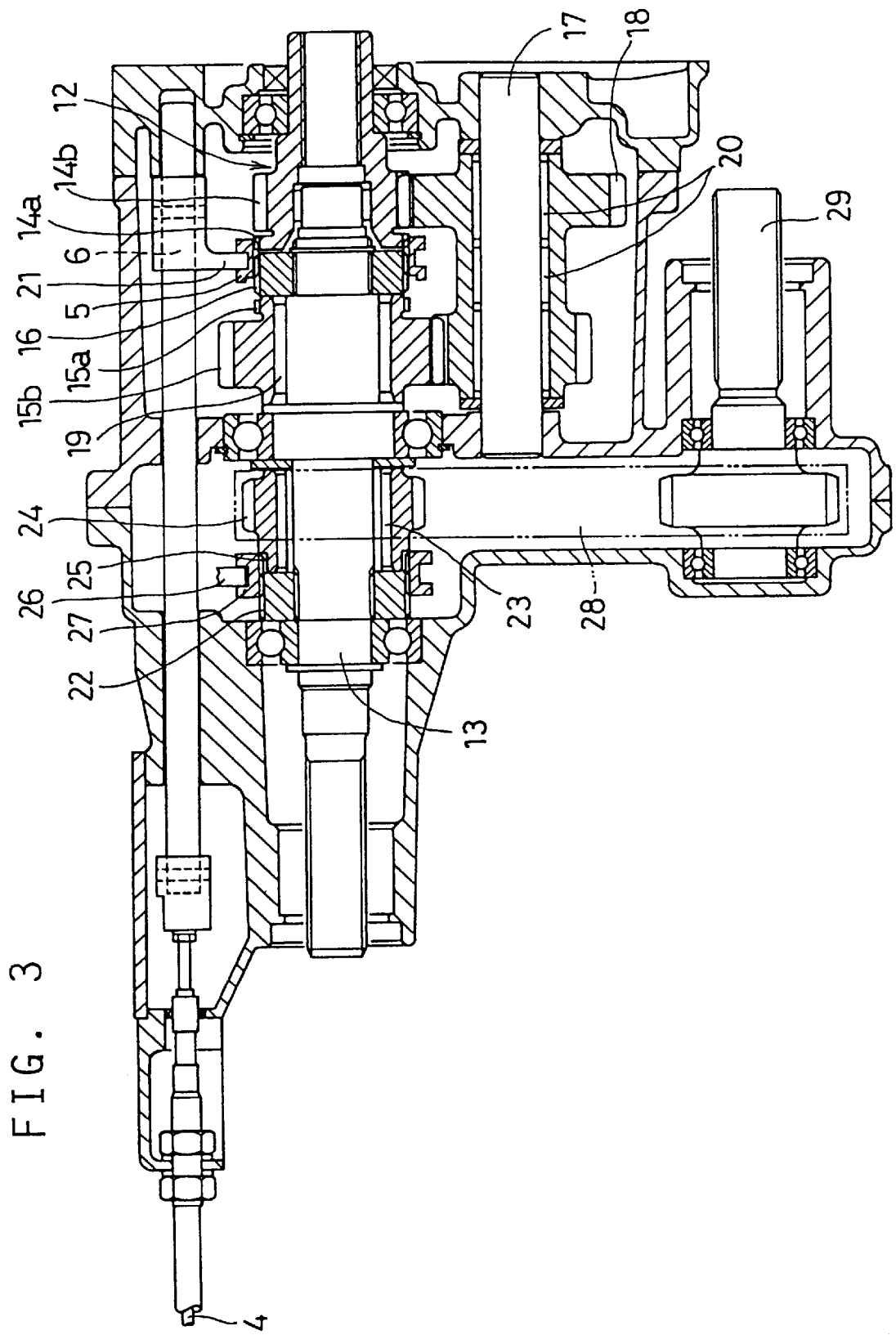
FIG. 3 is an enlarged sectional view of a transfer in the device of FIG. 1.

Now referring to FIGS. 1–5, an embodiment of this invention is described. FIG. 1 shows the entire power transmission changeover device of the first embodiment. FIGS. 2 and 3 are enlarged views of an actuator and a transfer of the power transmission changeover device, respectively.

This embodiment uses an air actuator 2 with a diaphragm 1. Mounted on the front side of the diaphragm 1 is a rod 3 connected through a push-pull wire 4 to a rod 6 for advancing and retracting a slide gear 5 in the transfer.

Connected to the front and back sides of the diaphragm 1 are air pipes 7 and 8 for changeover to high and low positions of the sub-transmission, respectively.

Electromagnetic valves 9 and 10 are provided in the respective air pipes 7 and 8. The air pipes 7 and 8 merge into a single pipe having an accumulator 11 and connecting with a negative pressure source of the engine manifold, not shown.

For increased operating speed of the actuator 2, the air pipes 7, 8 and electromagnetic valves 9, 10 have sufficiently large inner diameters, i.e. 5 mm, which is more than twice the inner diameter of conventional such pipes and valves. The accumulator 11 can increase the actuating power of the actuator 2 from the start of its operation by accumulating negative pressure.

The electromagnetic valves 9, 10 are three-way valves. In their closed position, one port is open to the atmosphere. FIG. 2 shows a state in which the actuator 2 is in its high position with electromagnetic valve 9 in the pipe 7 for high position open and the valve 10 in the pipe 8 for low position closed. In this state, air in the space at the front side of the diaphragm 1 is sucked out by the negative pressure source, while outer air flows through the electromagnetic valve 10 into the space at its rear side. The diaphragm 1 is thus moved forward.

Mounted in the transfer are a hollow rotary shaft 12 for transmitting the output of the transmission, and a rotary shaft 13 provided coaxially with the shaft 12 and directly coupled to the rear propeller shaft. The sub-transmission comprises high gears 14a, 14b formed at one end of the rotary shaft 12, low gears 15a, 15b mounted on the rotary shaft 13, a neutral gear 16, the slide gear 5 capable of meshing with these gears 14a, 15a and 16, and a gear 18 mounted on a shaft 17 extending parallel to the rotary shafts 12, 13.

The low gears 15a, 15b and the gear 18 are rotatably supported by needle bearings 19, 20. The neutral gear 16 is relatively nonrotatably mounted on the rotary shaft 13. The slide gear 5 is in engagement with a fork 21 mounted to the rod 6 connected to the actuator 2 and is slidable axially of the rotary shaft 13.

FIG. 3 shows a state in which the sub-transmission is set in its high position with the slide gear 5 in mesh with the high gear 14a and the neutral gear 16. Thus, in this state, the turning torque of the rotary shaft 12 is transmitted through the high gear 14a, slide gear 5 and neutral gear 16 to the rotary shaft 13.

The rotary shaft 13 also carries a gear 22 fixed to the shaft 13, and a sprocket 24 rotatably mounted through needle bearings 23. At one end, the sprocket 24 has a gear 25 on its outer periphery. A slide gear 27 is in engagement with a fork 26 of a rod connected to a separate actuator, not shown, and is capable of meshing with the gears 22 and 25.

Through a silent chain 28 trained around the sprocket 24, power can be transmitted to a rotary shaft 29 coupled to the front propeller shaft. FIG. 3 shows the 4WD position, in which the slide gear 27 is in mesh with the gears 22 and 25, so that the turning torque transmitted to the rotary shaft 13 is transmitted directly to the rear propeller shaft and also transmitted through the gear 22, slide gear 27, gear 25, i.e. sprocket 24 and silent chain 28 to the rotary shaft 29 and then to the front propeller shaft. In the 2WD position, the slide gear 27 is moved leftwardly, separating from the gear 25. Thus, rotation torque is transmitted only to the rear propeller shaft.

Figure 4:
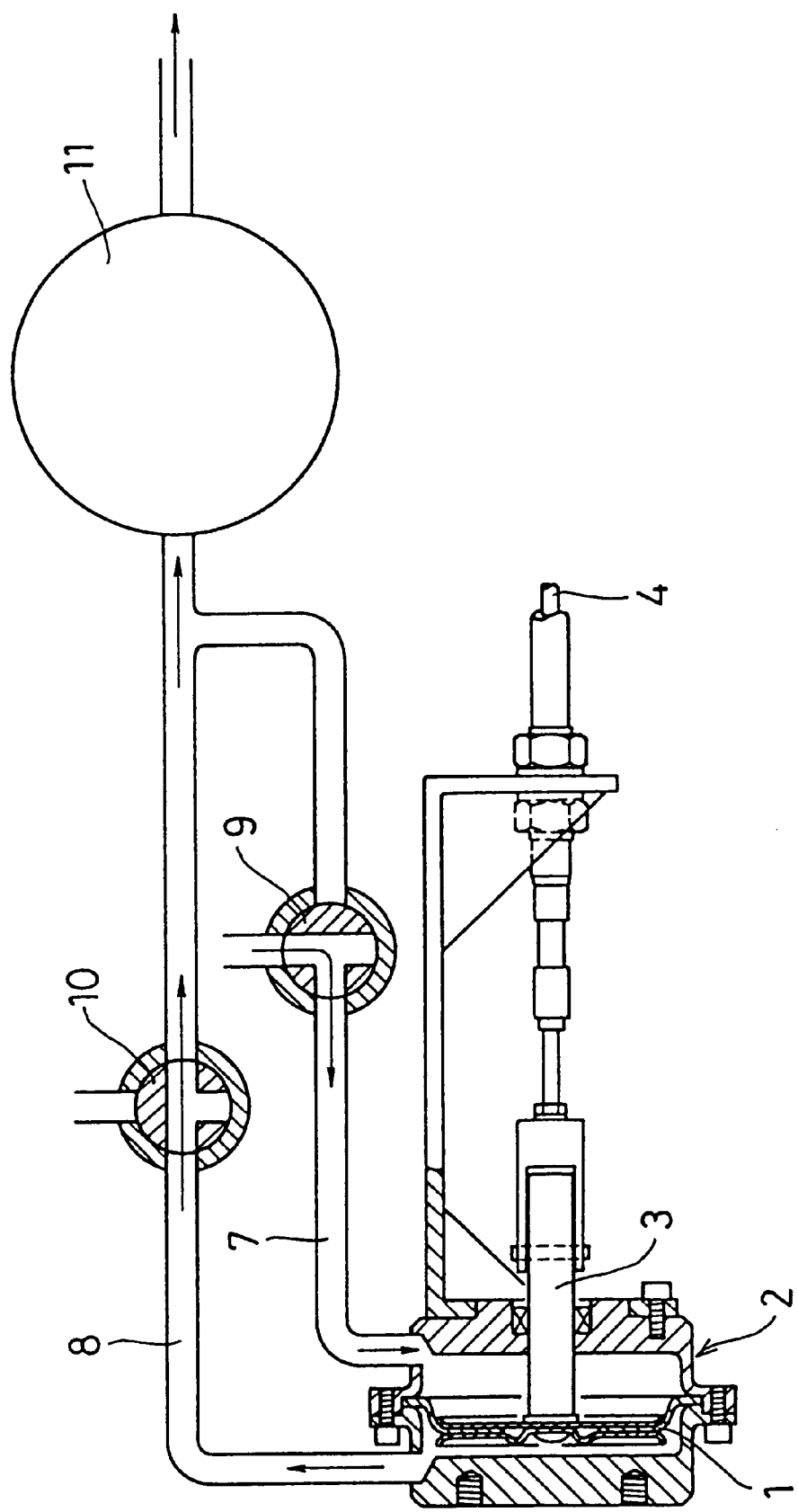
FIG. 4 is a sectional view of the actuator of FIG. 2 in low position.
Figure 5:
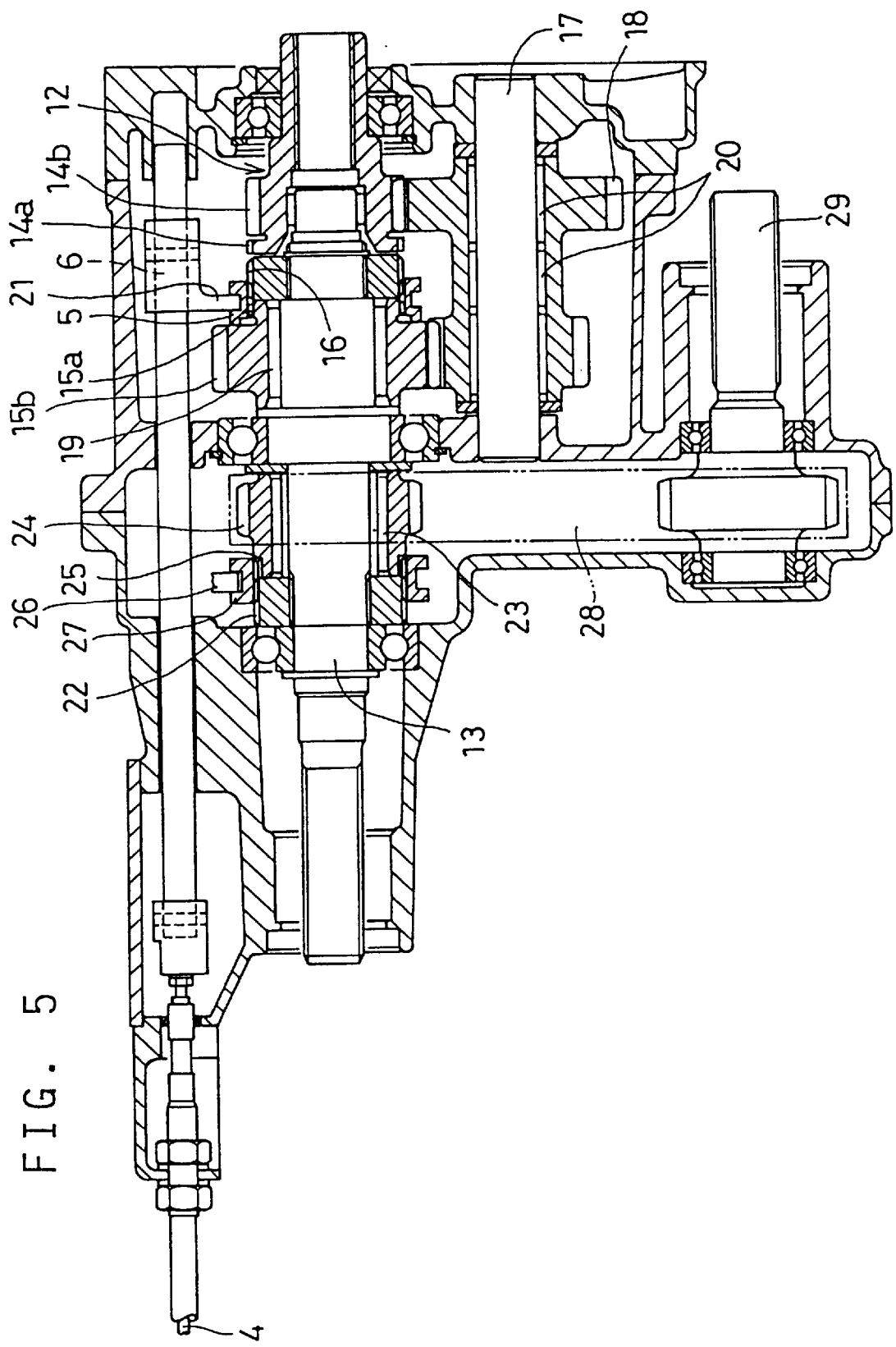
FIG. 5 is a sectional view of the transfer of FIG. 3 in low position.

FIGS. 4 and 5 are enlarged views of the actuator and the transfer when the power transmission changeover device has been changed over to the low position. In the actuator, the electromagnetic valve 10 in the pipe 8 for changeover to low position is open, and the valve 9 in the pipe 7 for changeover to high position is closed. Thus, air in the space facing the back side of the diaphragm 1 is sucked out by the negative pressure source, while outer air flows through the electromagnetic valve 9 into the space facing the front side, thereby moving the diaphragm rearwardly.

In the transfer, with the movement of the diaphragm 1, the slide gear 5 is brought into engagement with the fork 21 of the rod 6 and retracts leftwardly to mesh the low gear 15a with the neutral gear 16. In this state, the rotation torque of the rotary shaft 12 is transmitted through the high gear 14b, gear 18, low gears 15b, 15a, slide gear 5 and neutral gear 16 to the rotary shaft 13.

When the slide gear 5 moves from the high position shown in FIG. 3 to the low position shown in FIG. 5, it passes through the neutral position in which the slide gear 5 meshes only with the neutral gear 16 and not with the high gear 14a or low gear 15a. The same is true when it moves conversely from the low to high position.

With the power transmission device of the above embodiment, as described above, the pipes 7, 8 from the negative pressure source for actuating the actuator 2 and the electromagnetic valves 9, 10 have large inner diameters, and the accumulator 11 is provided between the negative pressure source of the pipes 7, 8 and the respective electromagnetic valves 9, 10. Thus, it is possible to dramatically increase the operating speed and force of the actuator 2 for moving the slide gear 5. But if the electric magnetic valves have an inner diameter of over 10 mm, such valves are too heavy and too bulky to be practical for cars.

With the power transmission changeover device for a four-wheel drive vehicle according to this invention, the pipes leading from the air pressure source and the electromagnetic valves for operating the actuator for changeover between high and low positions of the sub-transmission have an inner diameter of 4 mm or more. An accumulator is provided in the pipes. Thus, the operating speed and force of the actuator increase, shortening the time period in which the gears are in the neutral position, while increasing the meshing force with new gears. Gears thus mesh reliably without rattling of gears. Since the slide gear for gear changeover is connected to the actuator by the rigid push/pull wire, forward and backward movements of the actuator can be reliably transmitted to the slide gear.

(Second Embodiment)

Figure 6:
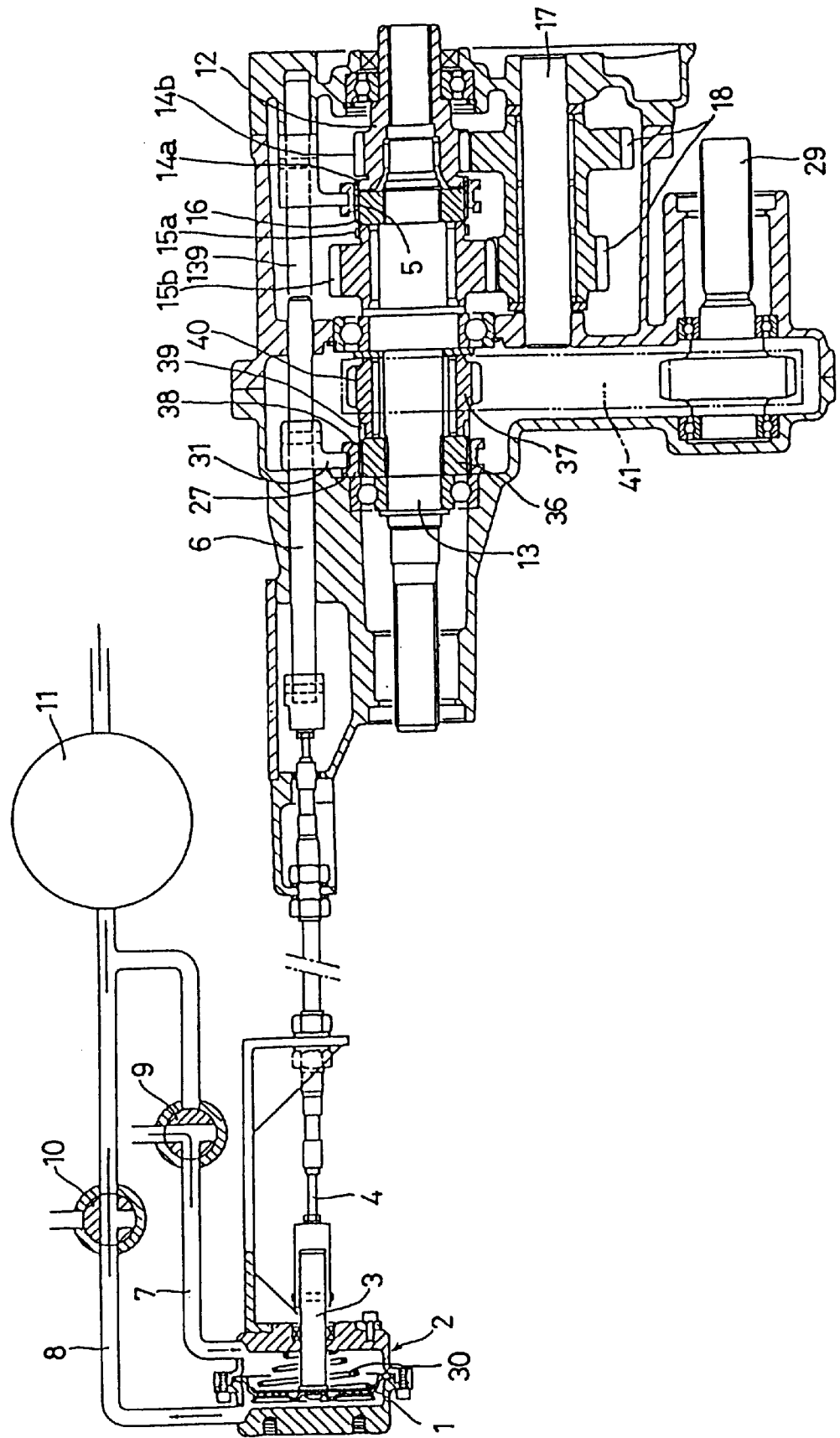
FIG. 6 is a partial sectional view of a power transmission changeover device of a second embodiment, showing a state in which it has just been changed over to a 2WD position.
Figure 7:
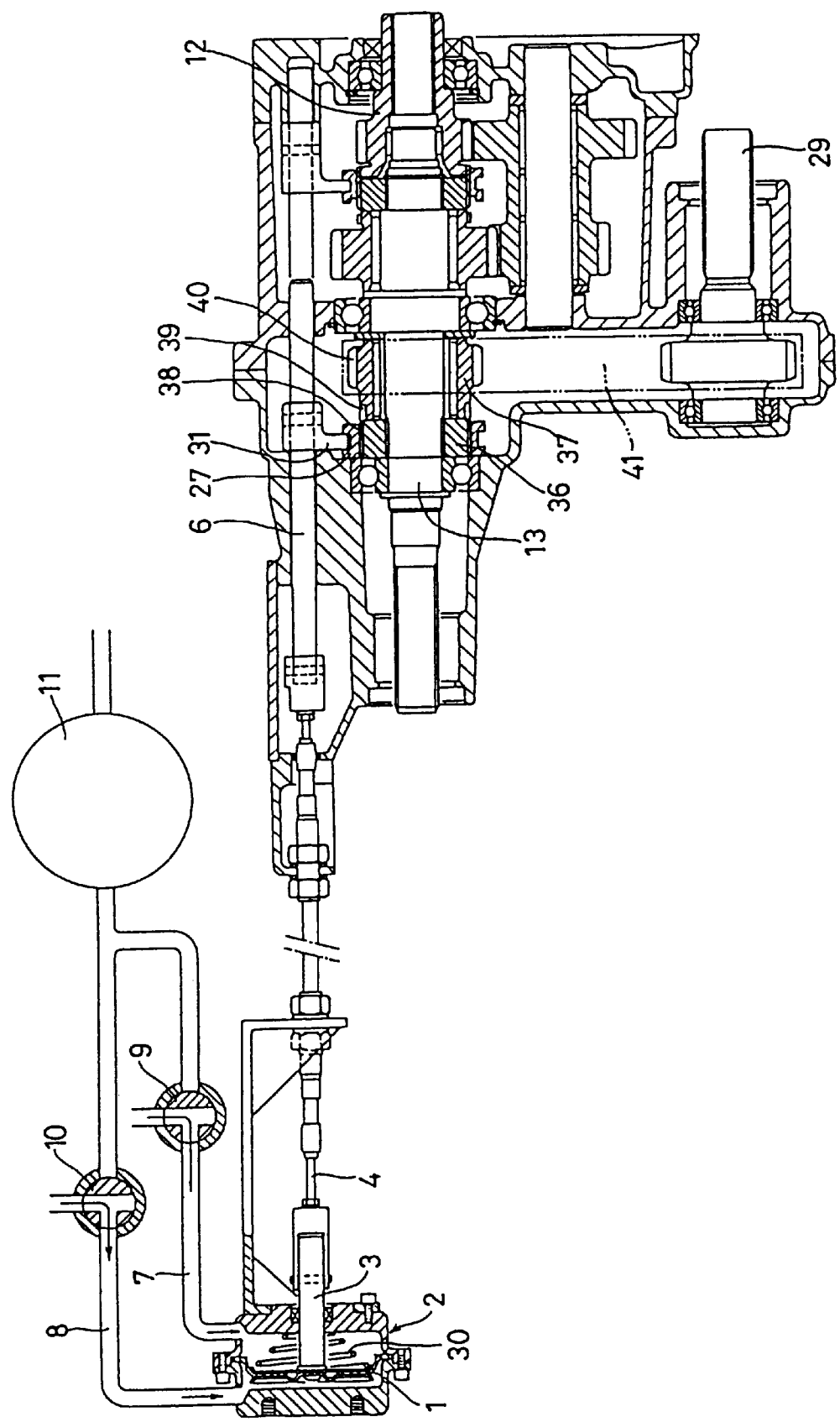
FIG. 7 is a view similar to FIG. 6, but showing a state in which the device is maintained in the 2WD position.
Figure 8:
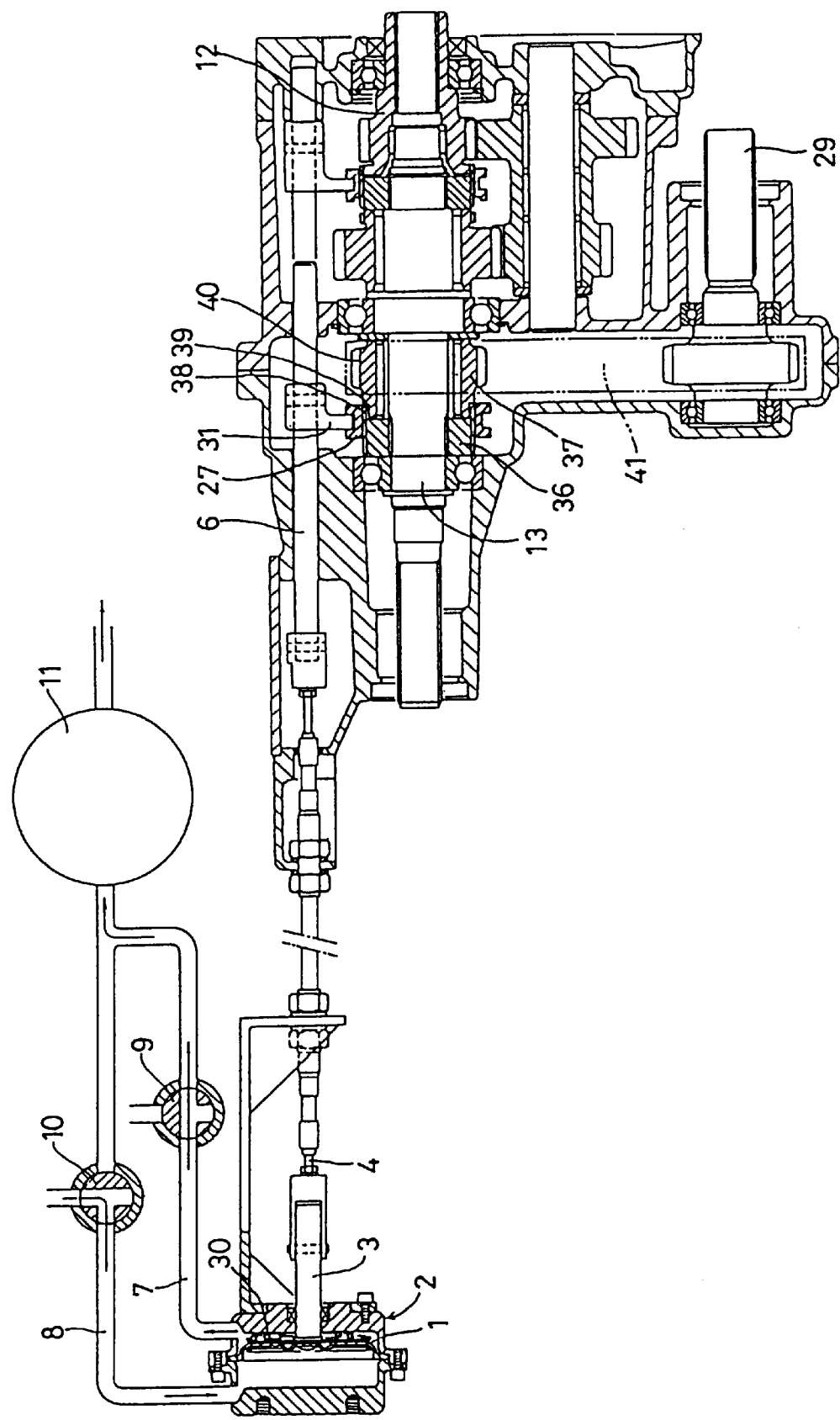
FIG. 8 is a view similar to FIG. 6, but showing a state in which the device has just been changed over to a 4WD position.

FIGS. 6–8 show a second embodiment. The power transmission changeover device of this embodiment comprises an actuator unit and a transfer unit. A rod 3 is secured to the front side of a diaphragm 1 mounted in an air actuator 2 and is connected by a push-pull wire 4 to a rod 6 carrying a fork 21 in engagement with a slide gear 5 in the transfer.

Air pipes 7 and 8 for changeover to 4WD and 2WD, respectively, are connected to the front and rear sides of the diaphragm 1. A coil spring 30 is mounted in a space facing the front side of the diaphragm. Electromagnetic valves 9 and 10 are provided in the respective air pipes 7 and 8. The pipes 7 and 8 merge into a single pipe which is connected through a negative pressure accumulator 11 to a negative pressure source of the engine manifold, not shown. The electromagnetic valves 9, 10 are three-way valves positioned so that one of their ports opens to the atmosphere when the valves are closed.

Mounted in the transfer are a transmission output shaft 12 and a rotary shaft 13 provided coaxially with the shaft 12 and directly connected to the rear propeller shaft. The rotary shaft 13 carries a relatively nonrotatable first rotary member 36 and a second rotary member 37 mounted through a bearing so as to be rotatable relative to the shaft 13. The rotary members 36 and 37 have gears 38 and 39 on their outer periphery, respectively. The gears 38, 39 are adapted to mesh with the slide gear 27.

Also formed on the outer periphery of the second rotary member 37 is a sprocket 40 around which is trained a silent chain 41 through which the engine power is transmitted to a rotary shaft 29 coupled to the front propeller shaft.

A sub-transmission is also mounted in the transfer. The sub-transmission includes a gear train for changing power transmission paths from the transmission output shaft 12 to the rotary shaft 13 directly connected to the rear propeller shaft. This gear train comprises high gears 14a, 14b formed on the outer periphery of the transmission output shaft 12 at one end thereof, low gears 15a, 15b and a neutral gear 16 mounted on the rotary shaft 13, a slide gear 5 adapted to mesh with the gears 14a, 15a, 16, and a gear 18 mounted on a shaft 17 extending parallel to the rotary shaft 13.

The low gears 15a, 15b and the gear 18 are rotatably mounted on the respective shafts through bearings. The neutral gear 16 is nonrotatable relative to the rotary shaft 13. The slide gear 5 is slid in the axial direction of the rotary shaft 13 by a rod 39 having a fork and connected to a separate actuator, not shown.

FIG. 6 shows a state in which the diaphragm 1 has just been moved to its 2WD position. In this state, the electromagnetic valve 10 in the pipe 8 for changeover to 2WD position is open, while the electromagnetic valve 9 in the pipe 7 for changeover to 4WD position is closed, so that the air in the space in the rear of the diaphragm 1 is sucked out by the negative pressure source, while outer air flows into the space in front of the diaphragm through the electromagnetic valve 9. The diaphragm 1 is thus moved rearwardly, i.e. leftwardly of the figure, together with the rod 6 having the fork and connected to the actuator 2 by the push/pull wire 4, and the slide gear 27 engaging the fork 31. The slide gear 27 thus disengages from the gear 39 on the second rotary member 37.

In FIG. 7, the diaphragm is kept in the 2WD position. In this state, both electromagnetic valves 9, 10 are closed, so that the spaces on both sides of the diaphragm are open to the atmosphere. That is, no air pressure is acting on the diaphragm in this state, so that the diaphragm is pressed to the rearmost position by the coil spring 30. The force of the coil spring 30 is set at a value smaller than the suction force applied to the diaphragm 1 from the negative pressure source.

FIG. 8 shows a state in which the diaphragm 1 has just been moved to its 4WD position. In this state, the electromagnetic valve 9 in the pipe 7 for changeover to 4WD position is open, while the electromagnetic valve 10 in the pipe 8 for changeover to 2WD position is closed, so that the air in the space in front of the diaphragm 1 is sucked out by the negative pressure source, while outer air flows into the space in the rear of the diaphragm through the electromagnetic valve 10. The diaphram 1 is thus moved forward, i.e. rightwardly of the figure, together with the rod 6, and the slide gear 27 engaging the fork 31. The slide gear 27 thus meshes with the gear 39 on the second rotary member 37, so that the engine power is transmitted to the rotary shaft 29 coupled to the front propeller shaft through the silent chain 41. To maintain the 4WD position, the electromagnetic valve 9 is kept open while the electromagnetic valve 10 is kept closed to keep sucking air out of the space in front of the diaphragm 1.

(Third Embodiment)

Figure 9:
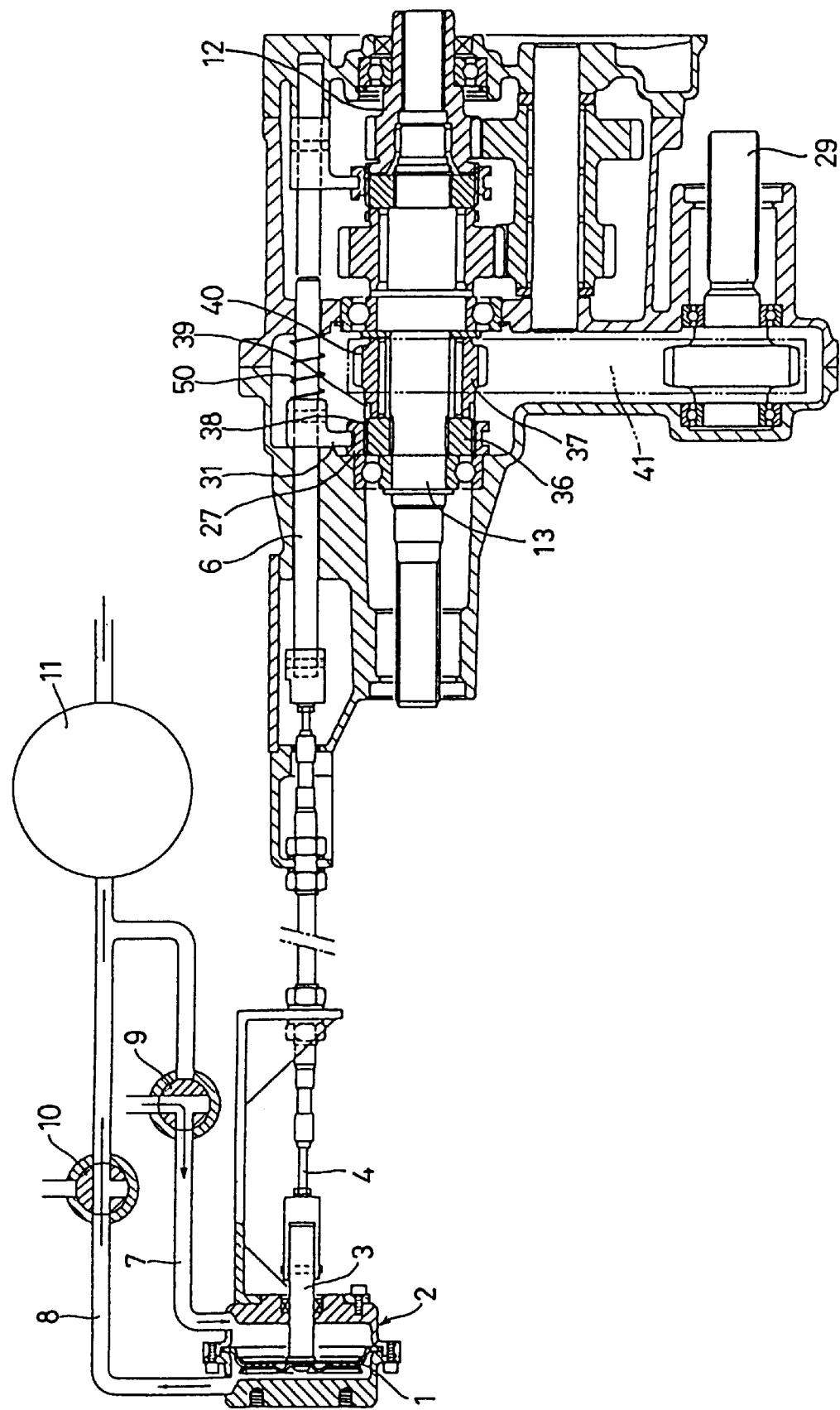
FIG. 9 is a partial, sectional view of a power transmission changeover device of a third embodiment, showing a state in which it has just been changed over to a 2WD position.
Figure 10:
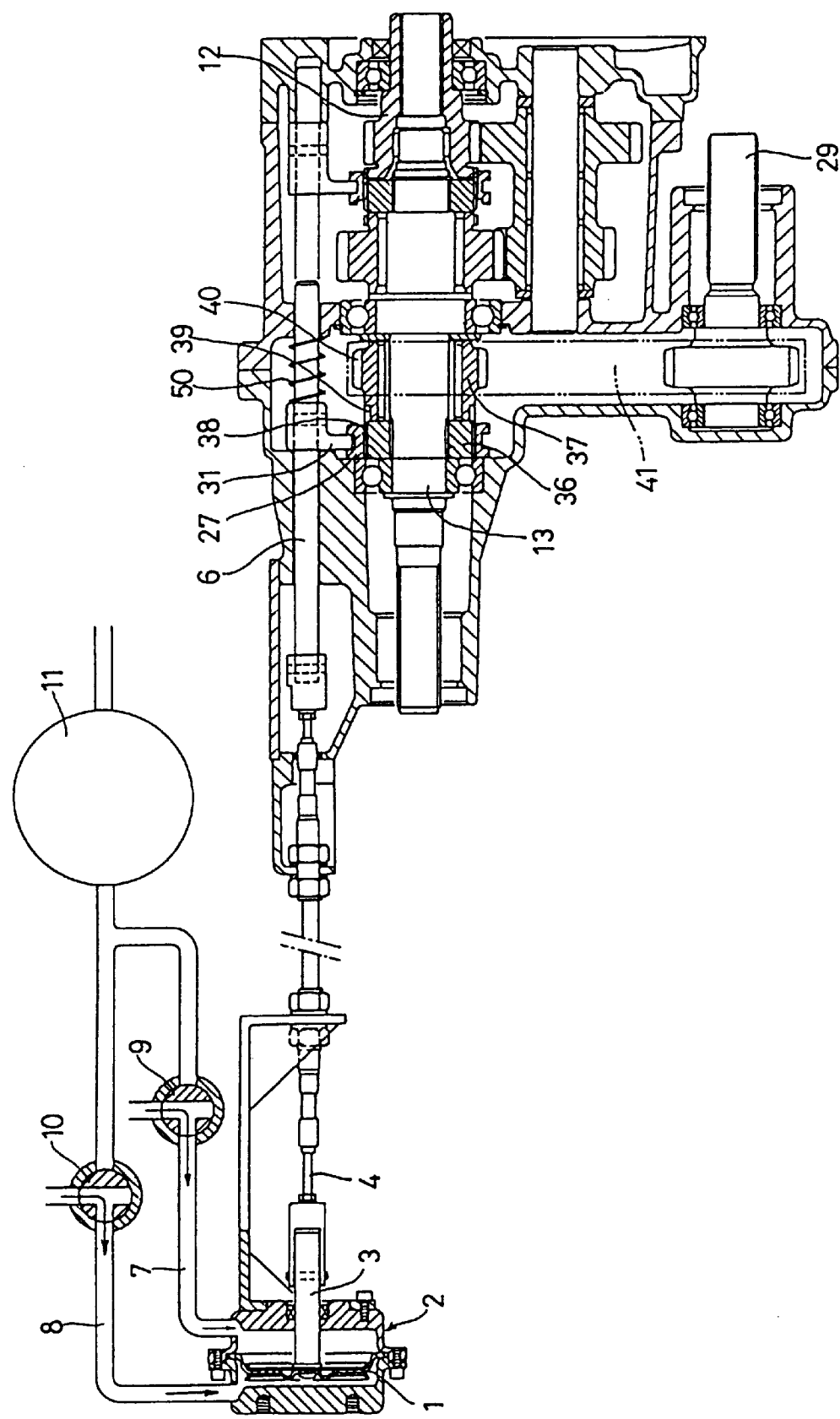
FIG. 10 is a view similar to FIG. 9, but, showing a state in which the device is maintained in the 2WD position.
Figure 11:
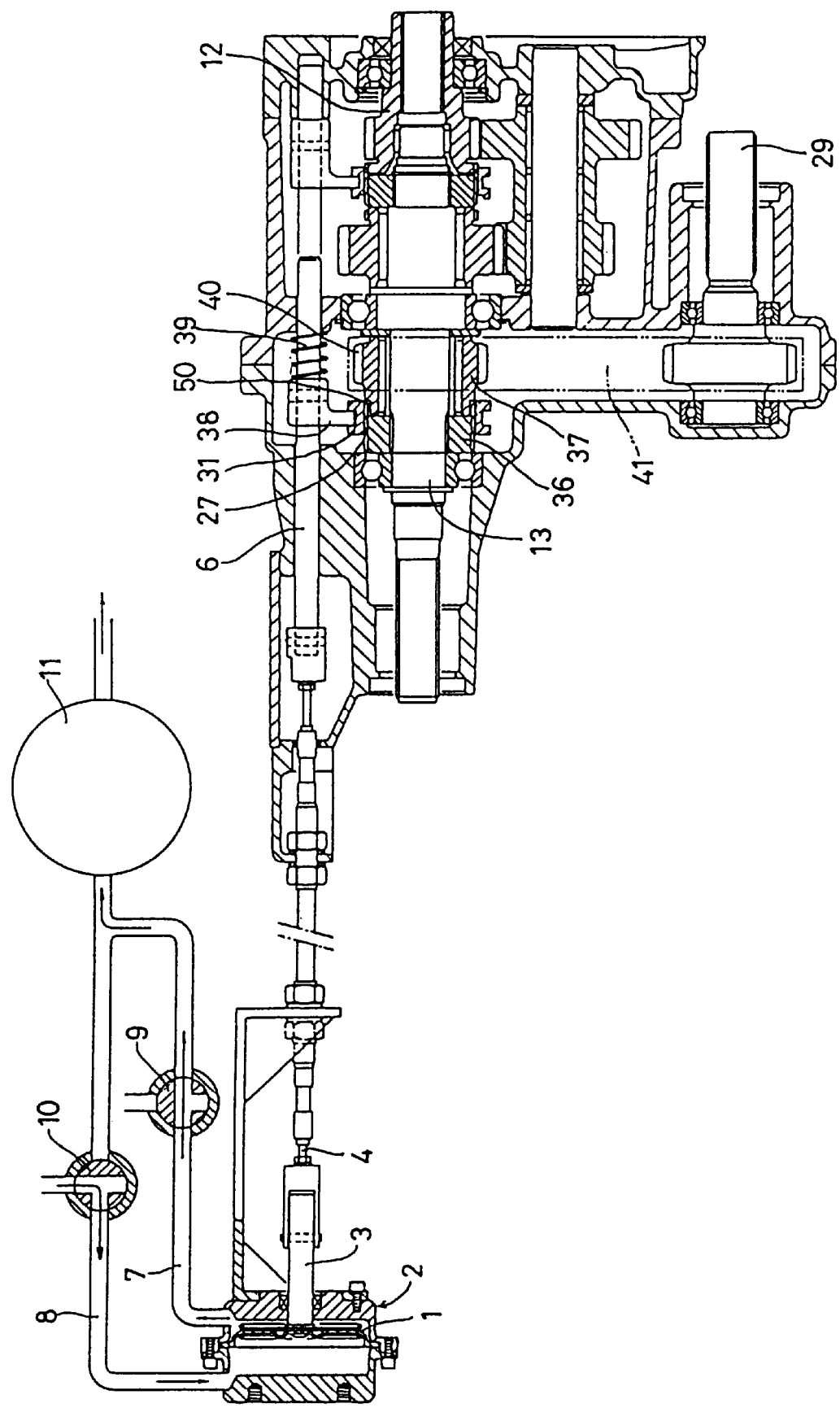
FIG. 11 is a view similar to FIG. 9, but showing a state in which the device has just been changed over to a 4WD position.

FIGS. 9 through 11 show the third embodiment. In its basic structure, the power transmission changeover device of this embodiment is the same as the second embodiment. But in this embodiment, instead of the coil spring 30 provided in the space in front of the diaphragm 1, a coil spring 50 is mounted on the rod 6 to bias the fork 31 leftwardly of the figure.

FIG. 9 shows a state in which the diaphragm 1 has just been moved to its 2WD position, FIG. 10 shows a state in which the diaphragm is maintained in the 2WD position, and FIG. 11 shows a state in which the diaphragm 1 has just been moved to its 4WD position. FIGS. 9–11 correspond to FIGS. 6–8 of the second embodiment, respectively. As shown in FIG. 10, the slide gear 27 is kept in the illustrated position by directly pushing the fork 31 leftwardly with the coil spring 50. In this state, both electromagnetic valves 9, 10 are closed as in the case of FIG. 7. The coil spring 50 has a spring force smaller than the suction force applied to the diaphragm 1.

Instead of the coil springs used in the above embodiments, a rubber spring may be used to bias the diaphragm 1 or the fork 31.

(Fourth Embodiment)

FIGS. 12 to 15 show the fourth embodiment. The power transmission changeover device of this embodiment is also basically of the same structure as the second embodiment. But in this embodiment, instead of the coil spring 30 secured to the front side of the diaphragm 1, magnets 51 and 52 are secured to the front and back sides of the diaphragm 1. The case of the actuator 2 is made from steel, a magnetizable material.

Figure 12:
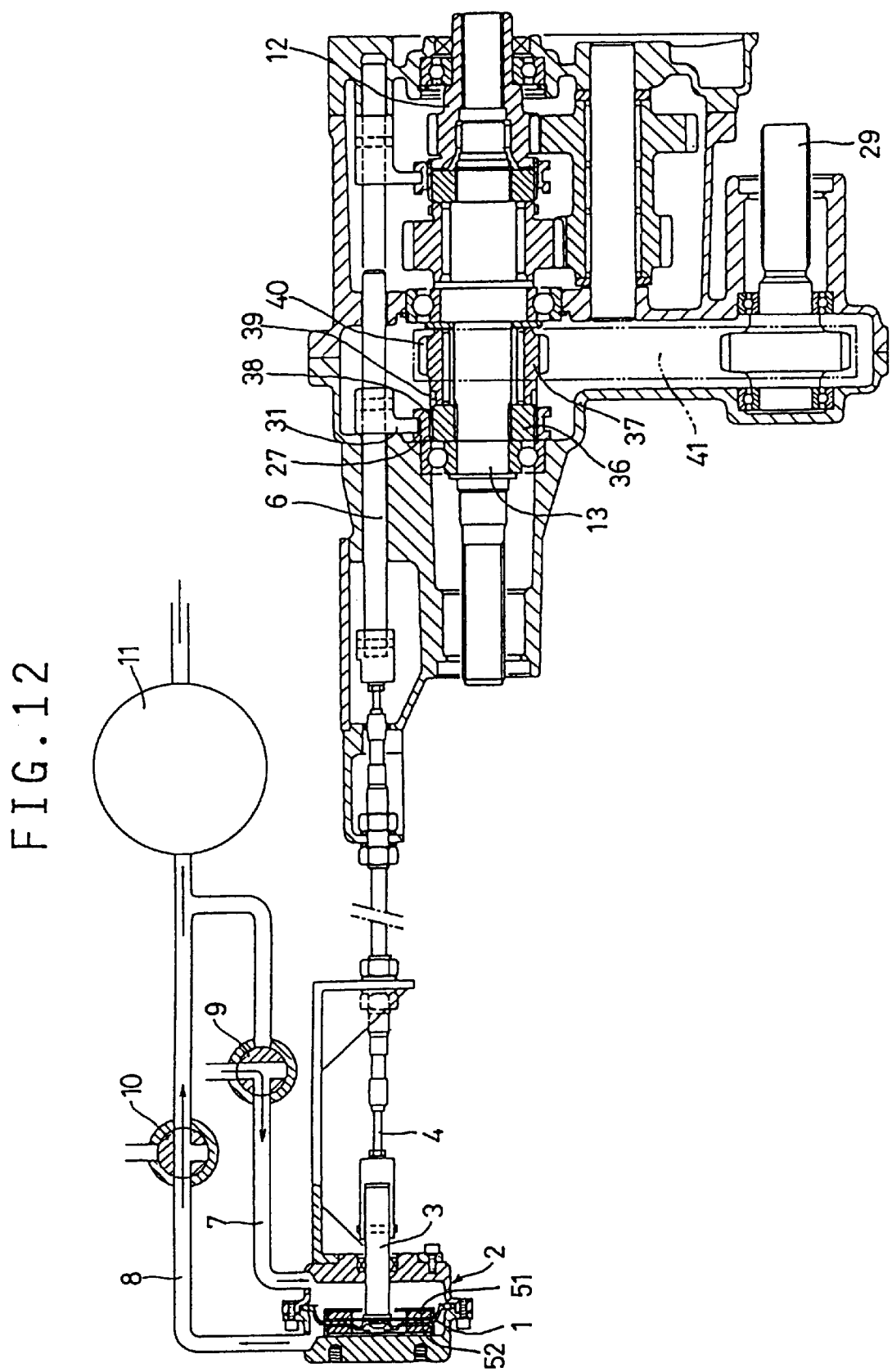
FIG. 12 is a partial, sectional view of a power transmission changeover device of a fourth embodiment, showing a state in which it has just been changed over to a 2WD position.
Figure 13:
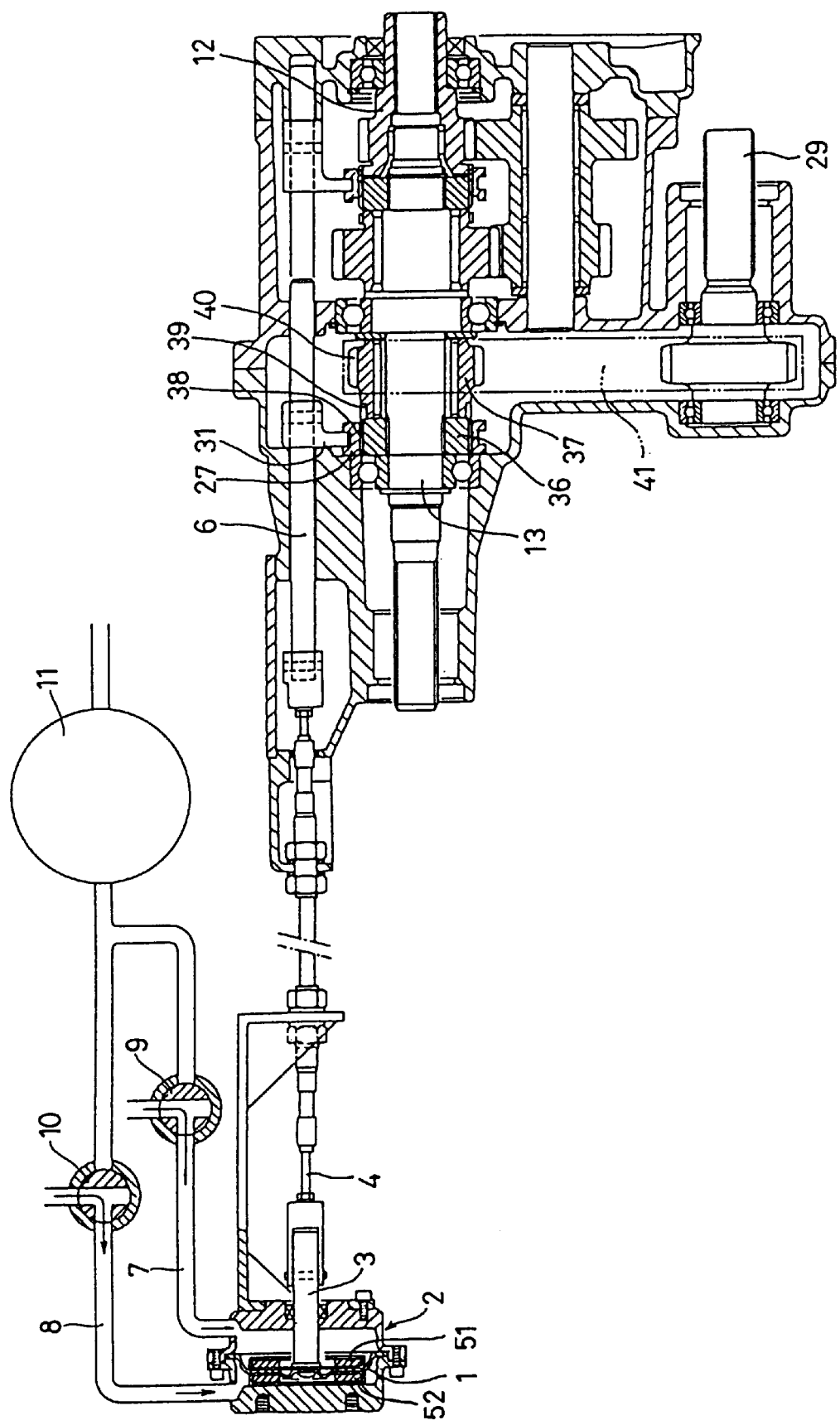
FIG. 13 is a view similar to FIG. 12, but showing a state in which the device is maintained in the 2WD position.
Figure 14:
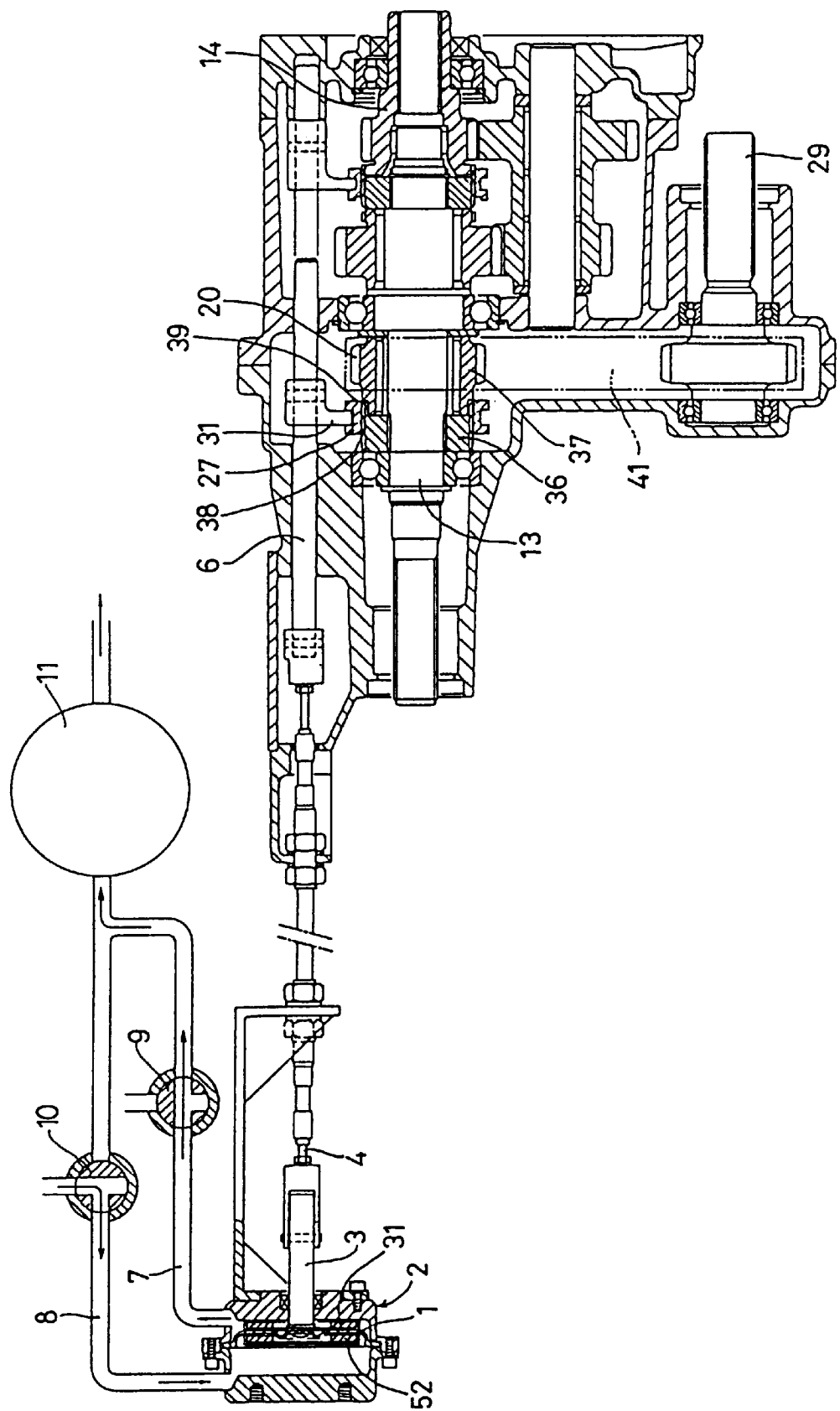
FIG. 14 is a view similar to FIG. 12, but showing a state in which the device has just been changed over to a 4WD position.
Figure 15:
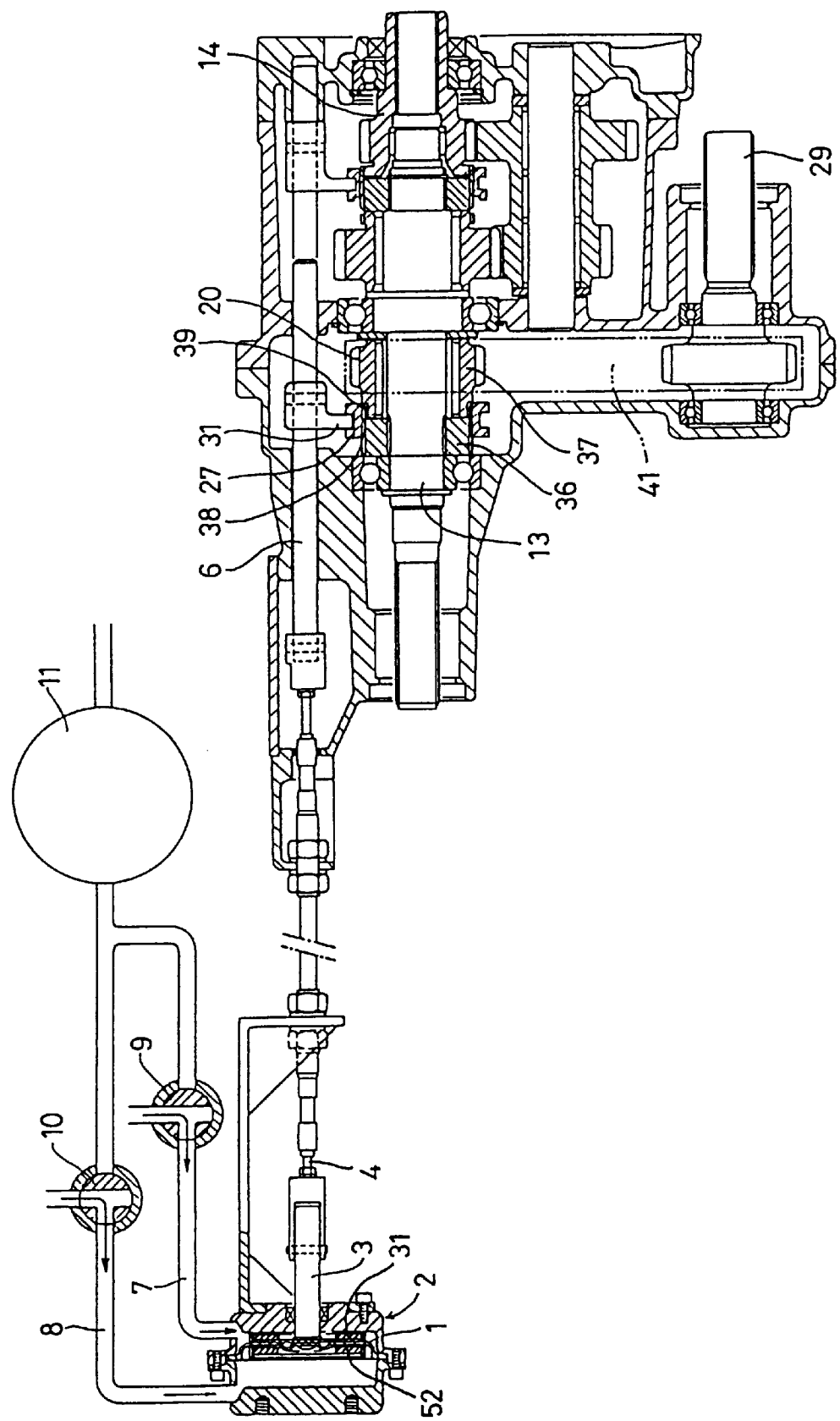
FIG. 15 is a view similar to FIG. 12, but showing a state in which the device is maintained in the 4WD position.

FIG. 12 shows a state in which the diaphragm 1 has just been moved to its 2WD position, FIG. 13 shows a state in which it is maintained in the 2WD position, FIG. 14 shows a state in which it has just been moved to its 4WD position, and FIG. 15 shows a state in which it is maintained in the 4WD position. This embodiment differs from the second and third embodiments in that the diaphragm 1 can be maintained in the 4WD position too.

In this embodiment, when the diaphragm 1 is moved to its 2WD position, the magnet 52 secured to the back side of the diaphragm 1 is magnetically attracted to the rear wall of the steel case of the actuator 2 (FIG. 13), so that the diaphragm is maintained in the 2WD position with the slide gear 27 kept in the leftward retracted position. When the diaphragm 1 is moved to its 4WD position, the magnet 51 secured to the front side of the diaphragm is magnetically attracted to the front wall of the steel case of the actuator 2 (FIG. 15), so that the diaphragm is maintained in the 4WD position with the slide gear 27 kept in the rightward advanced position.

While the slide gear 27 is maintained in either of the retracted and advanced positions with the diaphragm magnetically attracted to the steel case, both electromagnetic valves 9 and 10 are closed. As in the case of the coil spring 30 or 50, the magnetic force of each magnet 51, 52 is set at a value smaller than the suction force applied to the diaphragm.

(Fifth Embodiment)

FIGS. 16 to 19 show the fifth embodiment, in which an actuator 63 for high-low changeover of the sub-transmission is also provided with a diaphragm 64. A coil spring 65 is mounted in the space facing the rear side of the diaphragm 64. An air pipe 66 for changeover to the high position and an air pipe 67 for changeover to the low position are connected to the spaces in front and back of the diaphragm 64, respectively. Like the actuator 2, the pipes 66 and 67 have electromagnetic valves 68 and 69, respectively, and are connected to the negative pressure source of the engine manifold through an accumulator 70. The transfer has substantially the same structure as that shown in any of the above embodiments.

Figure 16:
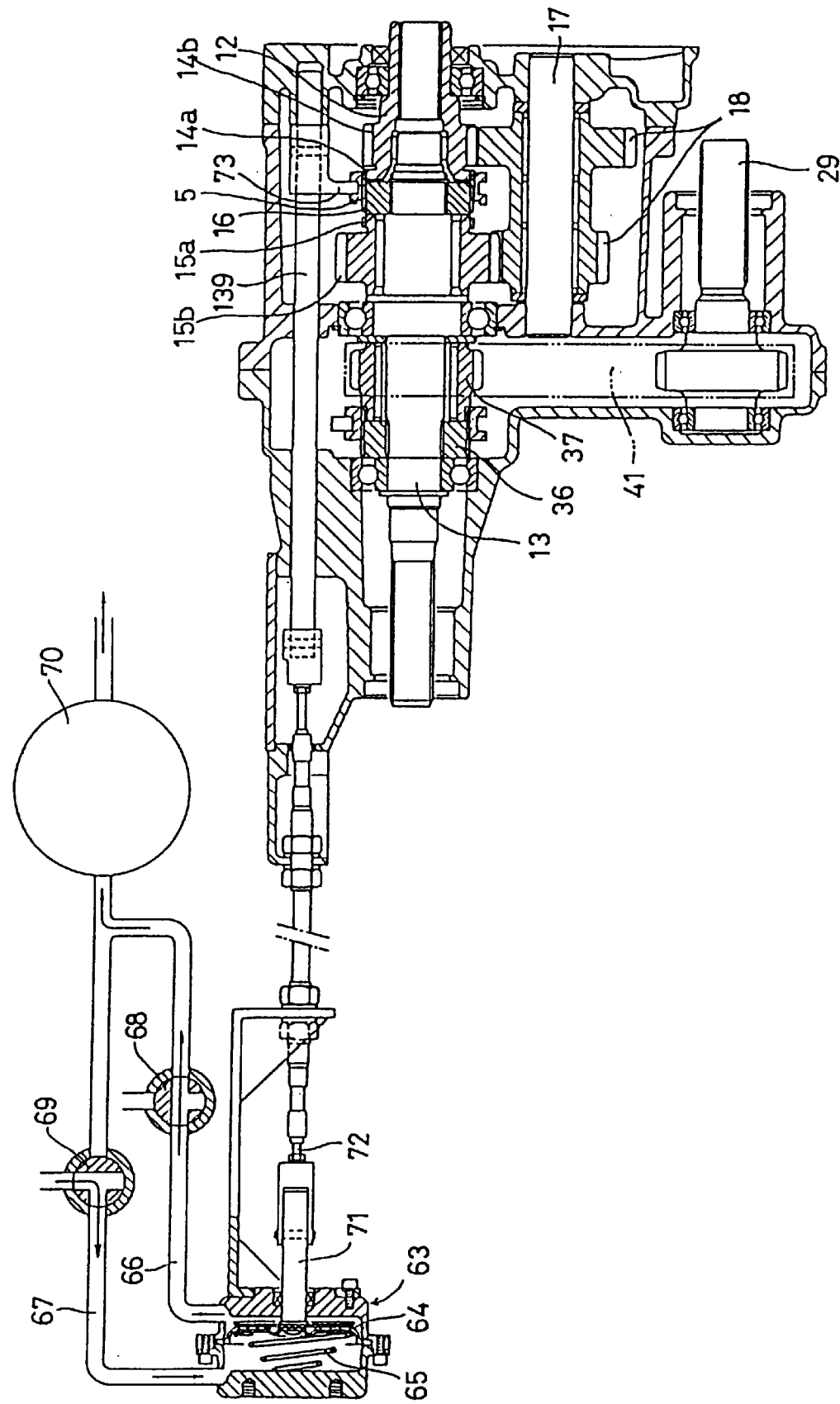
FIG. 16 is a partial, sectional view of a power transmission changeover device of a fifth embodiment, showing a state in which it has just been changed over to its high position.

FIG. 16 shows a state in which the diaphragm 64 has just been moved to its high position. In this state, the electromagnetic valve 68 in the pipe 66 for changeover to high position is open, while the electromagnetic valve 69 in the pipe 67 for changeover to low position is closed, so that the air in the space in front of the diaphragm 64 is sucked out by the negative pressure source, while outer air flows into the space in the rear of the diaphragm through the electromagnetic valve 69. The diaphragm 64 is thus moved forward, i.e. rightwardly of the figure, together with a rod 139 having a fork and connected by a push-pull wire 72 to the diaphragm 64 through a rod 71. Since the slide gear 5 is in engagement with the fork 73, it is also moved rightwardly together with the rod 39 to mesh with the high gear 14a and the neutral gear 16. The rotation torque of the transmission output shaft 12 is thus transmitted through the high gear 14a, slide gear 5 and neutral gear 16 to the rotary shaft 13.

Figure 17:
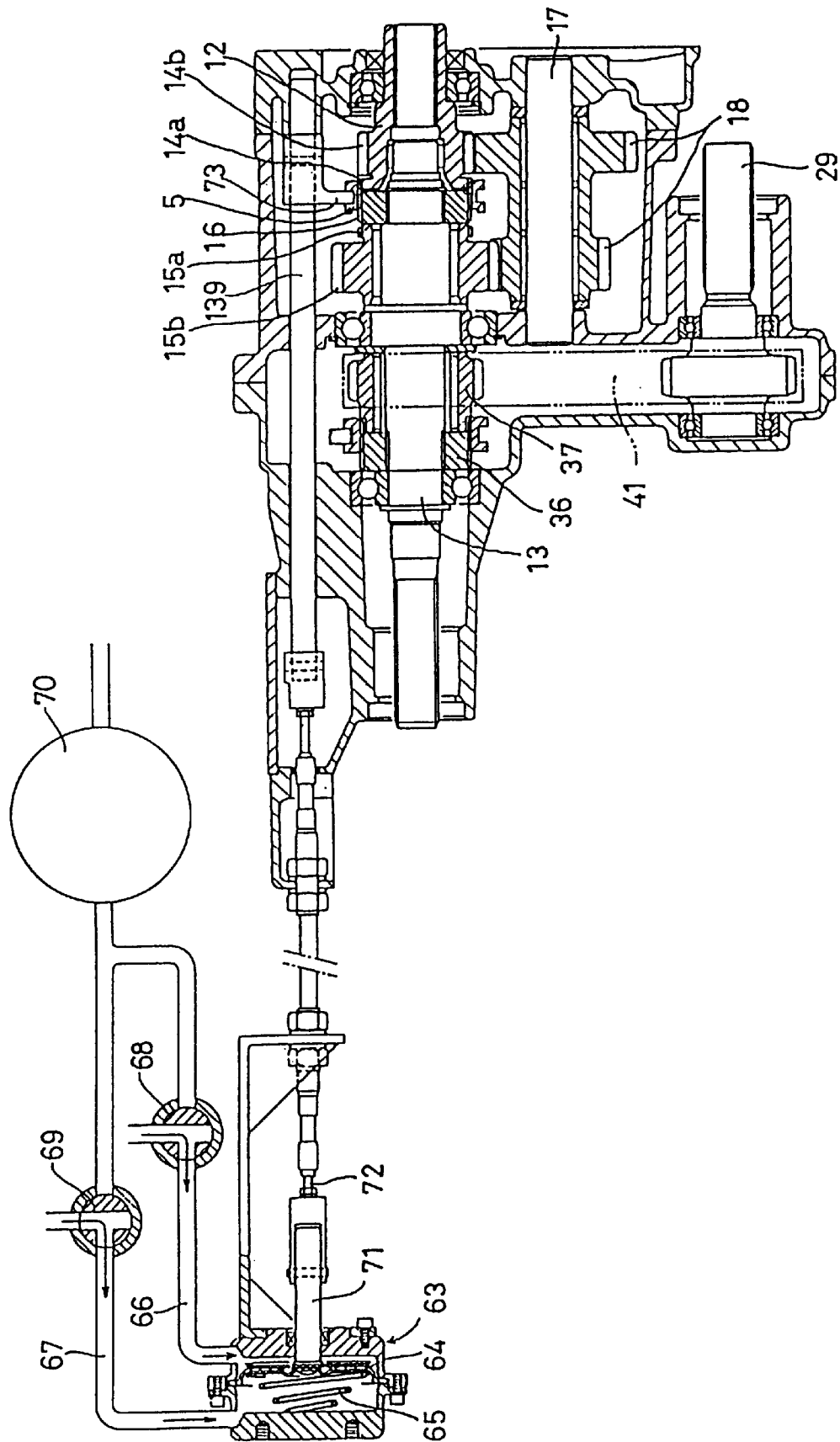
FIG. 17 is a view similar to FIG. 16, but showing a state in which the device is maintained in the high position.

In FIG. 17, the diaphragm 64 is kept in the high position. In this state, both electromagnetic valves 68, 69 are closed, so that no air pressure acts on the diaphragm. Thus, the diaphragm is pressed to the rear position by the coil spring 65 with the slide gear 5 also kept to the lefthand retracted position. The force of the coil spring 65 is set at a value smaller than the suction force applied to the diaphragm 64 by the negative pressure source.

Figure 18:
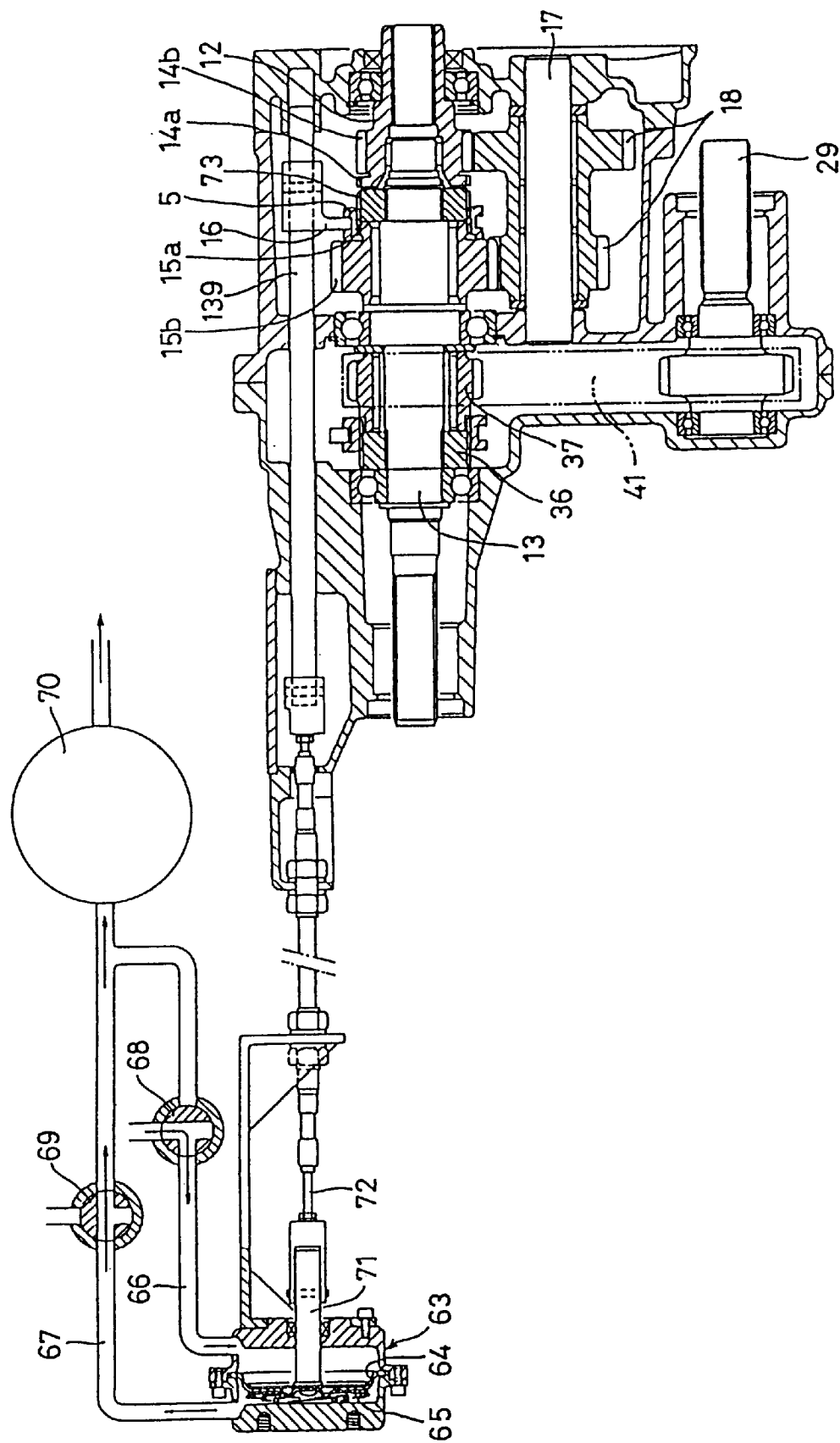
FIG. 18 is a view similar to FIG. 16, but showing a state in which the device has just been changed over to its low position.

FIG. 18 shows a state in which the diaphragm 64 has just been moved to its low position. In this state, the electromagnetic valve 69 in the pipe 67 for changeover to low position is open, while the electromagnetic valve 68 in the pipe 66 for changeover to high position is closed, so that the air in the space in the rear of the diaphragm 64 is sucked out by the negative pressure source, while outer air flows into the space in front of the diaphragm through the electromagnetic valve 68. The diaphragm 64 is thus moved rearward, i.e. leftwardly of the figure, together with the rod 39 having the fork. Since the slide gear 5 is in engagement with the fork 73, it is also moved leftwardly together with the rod 39 to mesh with the low gear 15a and the neutral gear 16. The rotation torque of the transmission output shaft 12 is thus transmitted through the high gear 14b, gear 18, low gears 15b, 15a, slide gear 5 and neutral gear 16 to the rotary shaft 13.

(Sixth Embodiment)

Figure 19:
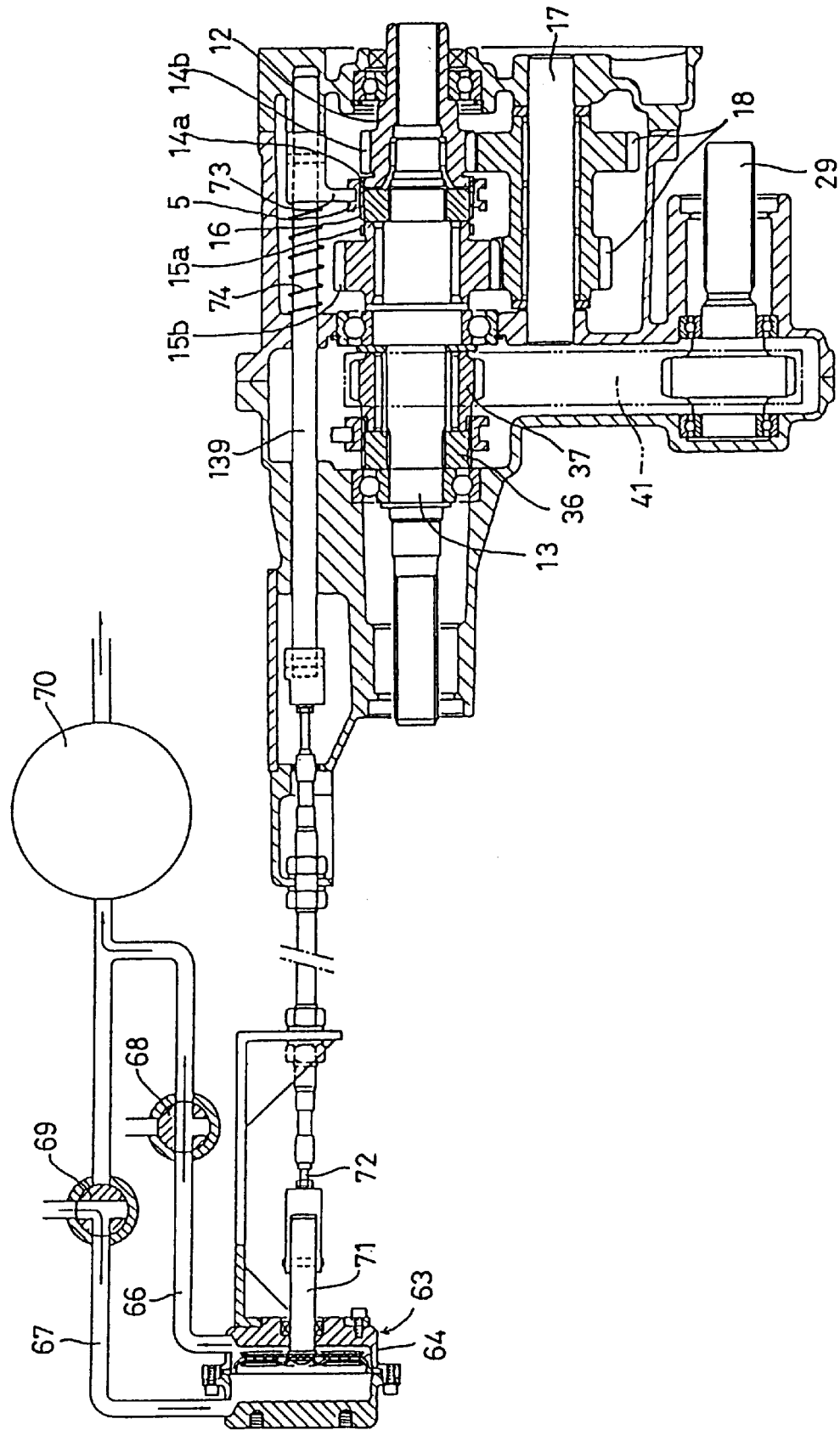
FIG. 19 is a partial, sectional view of a power transmission changeover device of a sixth embodiment, showing a state in which it has just been changed over to its high position.
Figure 20:
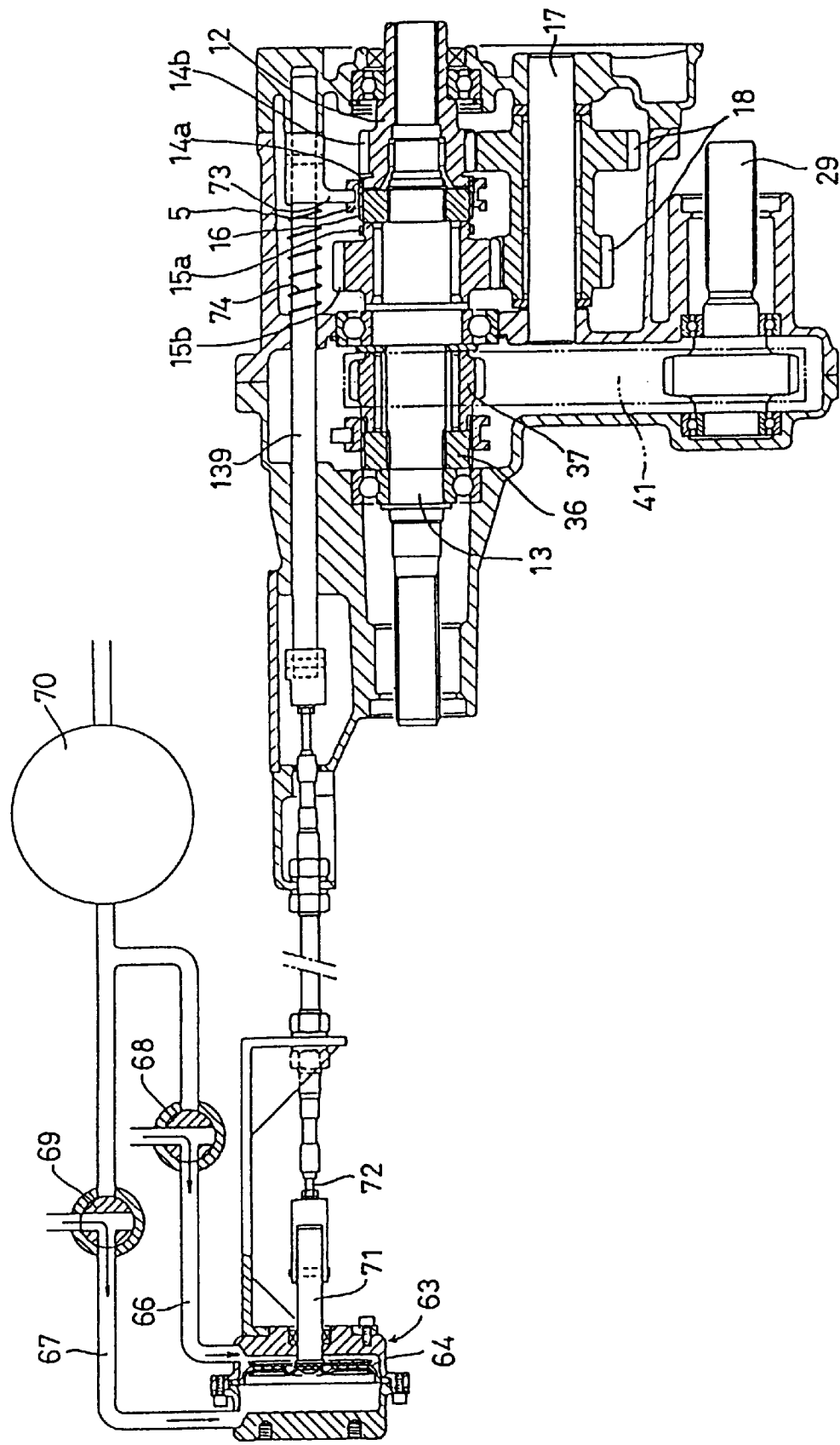
FIG. 20 is a view similar to FIG. 19, but showing a state in which the device is maintained in the high position.
Figure 21:
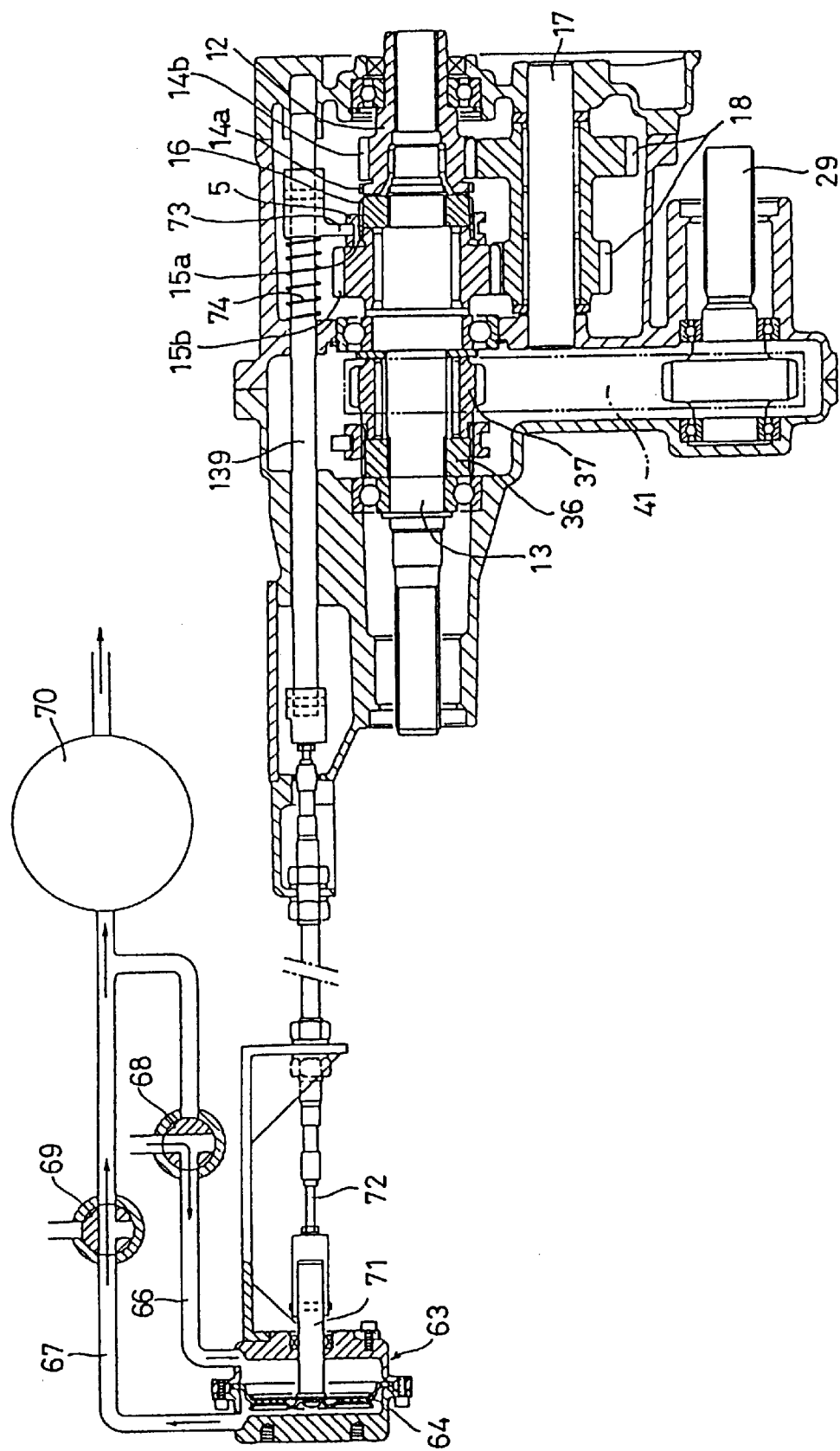
FIG. 21 is a view similar to FIG. 19, but showing a state in which the device has just been changed over to its low position.

FIGS. 19 to 21 show the sixth embodiment. The power transmission changeover device of this embodiment is basically of the same structure as the fifth embodiment. But instead of the coil spring 65 mounted on the rear of the diaphragm 64, a coil spring 74 is mounted on the rod 39 to bias the fork 73 rightwardly.

FIG. 19 shows a state in which the diaphragm 64 has just been moved to its high position. FIG. 20 shows a state in which it is maintained in the high position. FIG. 21 shows a state in which it has just been moved to the low position. These figures correspond to FIGS. 16 to 18 of the fifth embodiment. In this embodiment, as shown in FIG. 20, the coil spring 74 directly pushes the fork 73 rightwardly to maintain the slide gear 5 in position. In the state of FIG. 20, the electromagnetic valves 68, 69 are both shut as in FIG. 17. The force of the coil spring 74 is set at a value smaller than the suction force applied to the diaphragm 64.

(Seventh Embodiment)

Figure 22:
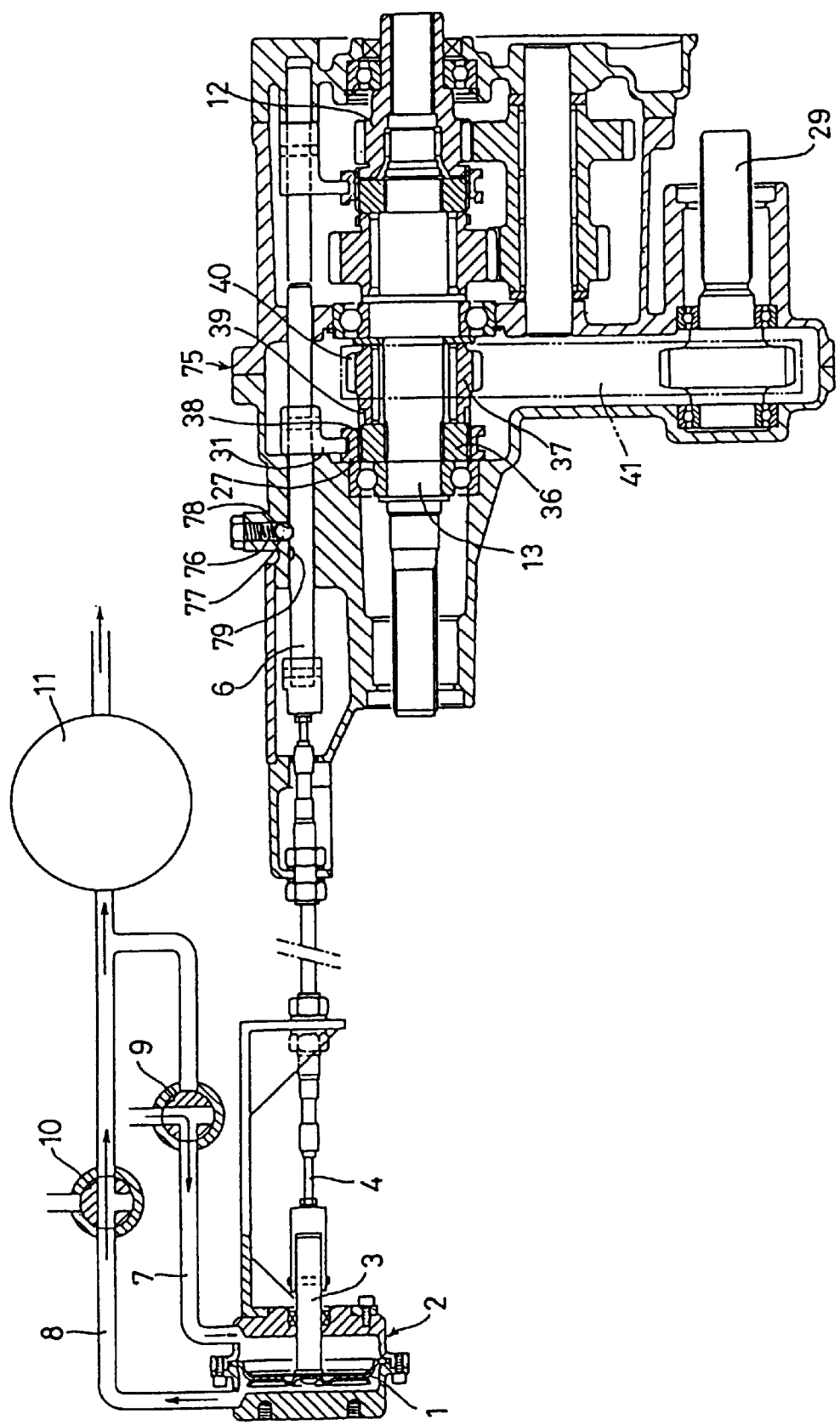
FIG. 22 is a partial, sectional view of a power transmission changeover device of a seventh embodiment.

FIG. 22 shows the seventh embodiment. The power transmission changeover device of this embodiment is basically of the same structure as the second embodiment. But instead of the coil spring 30 mounted in front of the diaphragm 1, a ball 77 biased by a coil spring 76 is mounted on a casing 75 of the transfer. A rod 6 carrying a fork 31 has two grooves 78, 79 each having a spherical bottom opposite the ball 77.

FIG. 22 shows a state in which the slide gear 27 has just been changed over to 2WD position by the actuation of the diaphragm 1. In this state, the ball 77 fits in the groove 78 on the right, holding the rod 6 and thus the slide gear 27 in position. When the diaphragm 1 is moved forward, the ball 77 rolls out of the groove 78 and fits in the lefthand groove 79, thus holding the slide gear 27 in 4WD position.

Means for holding the slide gear for changeover between 4WD and 2WD in the respective positions used in the fourth and seventh embodiments can be used as means for holding the slide gear for changeover between high and low positions in its respective positions, too.

The above embodiments describe power transmission changeover devices which can maintain the position of the slide gear for changeover between 4WD and 2WD or the position of the slide gear in the sub-transmission for changeover between high and low positions by using a coil spring or a magnet. It is also possible to hold the positions of both of the slide gears.

In the power transmission changeover device for a four-wheel drive vehicle according to this invention, a slide gear for changeover between 4WD and 2WD or between high and low positions is held in its respective positions by a coil spring or magnets. Thus, while the respective positions are being maintained, the power source of the actuator can be kept deactivated to remove load on the actuator. Durability and reliability of the actuator thus improve.

What is claimed is:

1. A power transmission device for a four-wheel drive vehicle, comprising: a first rotary shaft for transmitting an output of an automatic transmission; a high gear mounted on the outer periphery of said first rotary shaft at one end thereof; a second rotary shaft provided coaxially with said first rotary shaft for transmitting power to one of a front propeller shaft and a rear propeller shaft; a neutral gear relatively nonrotatably mounted on the outer periphery of said second rotary shaft at one end thereof in proximity to said high gear; a low gear relatively rotatably mounted on said second rotary shaft in proximity to said neutral gear; a slide gear provided so as to be slidable in the axial direction of said first and second rotary shafts; and an actuator connected to said slide gear and operated under air pressure through electromagnetic valves and piping to be connected to an air pressure source; wherein said slide gear is adapted to mesh with said high gear and said neutral gear when advanced, and with said low gear and said neutral gear when moved backward, whereby the transmission path of rotation torque from said first rotary shaft to said second rotary shaft is changed over by a gear train comprising said high gear, said low gear and said neutral gear; wherein said piping and said electromagnetic valves have inner diameters of 4 mm or over; and wherein an accumulator is provided in said piping between said electromagnetic valves and a location of said piping to be connected to the air pressure source.

2. A power transmission changeover device as claimed in claim 1 wherein said slide gear and said actuator are connected together through a push/pull wire.

* * * * *